United States Patent [19]

Naae et al.

[11] Patent Number: 6,100,385
[45] Date of Patent: Aug. 8, 2000

[54] CATALYTIC METHOD FOR THE PREPARATION OF LIGNIN PHENOL SURFACTANTS IN ORGANIC SOLVENTS

[75] Inventors: Douglas Gene Naae, Sugar Land; Lawrence Edward Whittington, Katy; Dan Edward Kieke, Sealy, all of Tex.

[73] Assignee: Texaco Inc., White Plains, N.Y.

[21] Appl. No.: 09/082,812

[22] Filed: May 21, 1998

[51] Int. Cl.[7] .............................. C07G 1/00; C08L 97/00
[52] U.S. Cl. ........................................ 530/502; 530/506
[58] Field of Search ...................................... 530/502, 506

[56] References Cited

U.S. PATENT DOCUMENTS

| | | | |
|---|---|---|---|
| 3,105,095 | 9/1963 | Oshima et al. | |
| 3,223,698 | 12/1965 | Oshima et al. | |
| 3,702,886 | 11/1972 | Argauer et al. | 423/328 |
| 4,647,704 | 3/1987 | Engel et al. | 568/716 |
| 4,731,491 | 3/1988 | Urban et al. | 568/761 |
| 4,739,040 | 4/1988 | Naae et al. | 530/503 |
| 4,787,454 | 11/1988 | Naae et al. | 166/274 |
| 4,821,803 | 4/1989 | Debons | 166/273 |
| 5,035,288 | 7/1991 | Kieke et al. | 166/274 |
| 5,094,295 | 3/1992 | Morrow | 166/274 |
| 5,095,985 | 3/1992 | Naae et al. | 166/274 |
| 5,095,986 | 3/1992 | Naae et al. | 166/274 |
| 5,230,814 | 7/1993 | Naae et al. | 252/8.551 |
| 5,340,466 | 8/1994 | Nelson et al. | 203/56 |
| 5,358,633 | 10/1994 | Dai et al. | 208/216 |
| 5,441,630 | 8/1995 | Dai et al. | 208/216 |
| 5,459,118 | 10/1995 | Dai et al. | 240/413 |

OTHER PUBLICATIONS

T.P. Schultz, R.J. Preto, J.L. Pittman and I.S. Goldstein, J. Wood Chem. and Tech., 1982, 2, 17.
A. Vuori and J.B. Soy Bredenbert, Holzporschuner, 1988, 42, 155.
P.M. Train and M.T. Klein, Fuel Science and Technology, Int'l., 9(2) 193–227, 1991.
D. Meier, R. Ante, O. Faix, Biosource Technology, 1992, 40, 171.
Haynes, Jr., H.W., Improved Catalysts for Coal Liquifaction, DE 88010547, 1988.
Song, Co, Schobert, H.H., and Hatcher, P.G., Energy and Fuels, G. 1992, p. 328–330.
Besson, M. et al., Fuel, 69, 1990, p. 35–43.
Trewhella, M.J., and Grint, A., Fuel, 1987, 66, 1315.
Kotanigawa, T., Yokoyama, S., Tamamoto, M., and Maekawa, Y., Fuel, 1989, 68, 618.
Pradhan, V.R., Tierney,J.W., Wender I., and Huffman, G.P., Energy & Fuels, 1991, 5, 497.
K.U. Sarkanen and H.C. Hegert, "Lignins, Occurrences, Formation, Structure and Reaction", Wiley, Interscience, NY 1971.
Altieri, P. and Coughlin, R.W., Energy & Fuels, 1, 1987, p. 253–256.
Sarkanen, K.V., "Wood Lignins", Chapter 6, The Chemistry of Wood, Browning, B.L., ed, 1975, p. 276.
M.W. Bedell and C.W. Curtis, Chemistry and Reactivity of Cyclic Olefins as Donors in Coal Liquifaction, 1991, 5, 469–476.

*Primary Examiner*—Nathan M. Nutter
*Attorney, Agent, or Firm*—Harold J. Delhommer; Lundeen & Arismendi

[57] ABSTRACT

A method of making surfactants from lignin is disclosed by reducing lignin in the presence of a metal oxide or iron based catalyst in an organic hydrogen donor solvent to produce lignin phenol and subjecting the lignin phenol to one or a combination of several reactions such as alkoxylation, alkylation, sulfonation, sulfation, alkoxysulfation, and sulfomethylation. The lignin surfactants so produced can be employed in a surfactant system to recover oil from underground formations.

18 Claims, 5 Drawing Sheets

FTIR Spectra of lignin phenol products prepared from Indonesian JHW lignin.

FTIR Spectra of lignin phenol products prepared from Indonesian JHW lignin (aromatic substitution pattern region).

APPENDIX A

Infrared Spectra of Lignin Samples

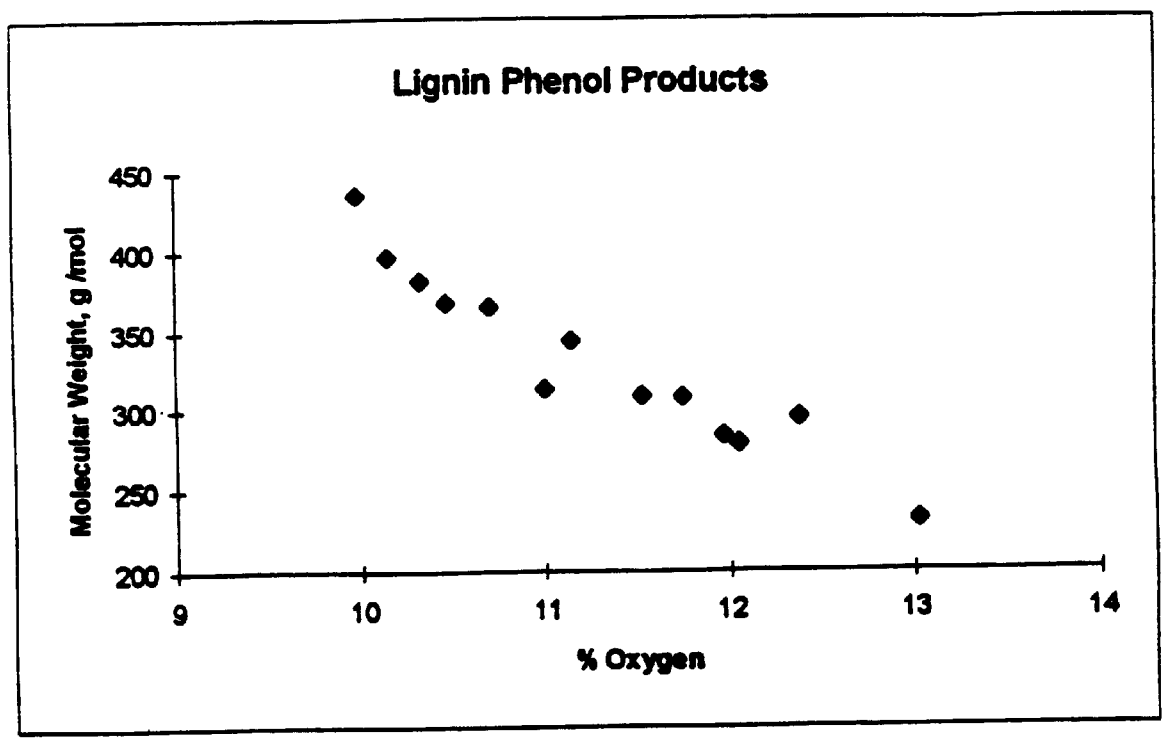
Figure 5   Plot of % Oxygen vs. Molecular Weight for the Lignin Phenol Products Prepared with the Metal Oxide Catalysts in Table 9.

CATALYTIC METHOD FOR THE PREPARATION OF LIGNIN PHENOL SURFACTANTS IN ORGANIC SOLVENTS

FIELD OF THE INVENTION

The present invention is primarily directed to a method of making surfactants from lignin. Particularly, the invention relates to reducing lignin to lignin phenols in the presence of a catalyst in an organic solvent and converting the lignin phenols to lignin surfactants by one or a combination of several reactions such as alkoxylation, alkylation, sulfonation, sulfation, alkoxysulfation and sulfomethylation. These catalysts increase the yield of lignin phenols, the chemical precursor to the lignin surfactants and improve the surfactant properties of the lignin surfactants. The lignin surfactants are used in enhanced oil recovery (EOR) systems to recover hydrocarbons from underground formations.

BACKGROUND

Surfactants have become very important chemicals in our society. Many types of surfactants are used for a myriad of applications. Generally, in order to work, surfactants require both water soluble and oil soluble characteristics. It is these mixed characteristics which enable surfactants to lower the interfacial tension between two disparate liquids.

Surfactants have been used in surfactant flooding systems for enhanced oil recovery. However, their use is limited primarily because of the relatively high cost of the surfactants which makes the surfactant flooding systems for oil recovery generally uneconomical. Recently, the economics of surfactant flooding have additionally become even more unfavorable with the low price of oil.

Surfactant flooding to recover oil has been actively investigated due to the relatively poor ability of water floods to displace remaining oil from a reservoir's pore structure. Because of the structure of the reservoir and relative interfacial tensions involved, the flood water may form channels or fingers, bypassing the oil in the formation. Even where water has flowed, residual oil is trapped in pores by viscous and capillary forces. Further flooding with water will not remove such oil.

Investigations of ways to increase oil recovery by improving the displacement ability of water floods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a water flood operation is dependent upon reservoir characteristics as well as the cost and availability of the surfactants.

Most surfactant floods have employed a petroleum sulfonate as a sole surfactant, or at least a major component of a mixture of surfactants. Synthetic alkyl benzene sulfonates and alkyl sulfonates and sulfates have also been proposed as oil recovery surfactants. To combat separation problems in surfactant mixtures, especially at high salinities (>2% salt), a material with both water soluble and oil soluble characteristics is usually added to sulfonate surfactant mixtures. These materials are generally referred to as "solubilizers" and are usually sulfate or sulfonate salts of polyethoxylated alcohols or alkylphenols. The choice and concentration of solubilizer employed is dependent upon the choice of surfactants used, their overall concentration, and salinity.

Although the reduction of lignin to produce simpler compounds has been extensively studied very few studies have focused on converting lignin to surfactants. The extensive research into the hydrogenation of lignins generally fits into two categories. Studies have been concerned with either the hydrogenation of wood as a pulping method or with the hydrogenation of lignin as a method to produce commodity chemicals. For a more detailed discussion of these studies, see U.S. Pat. No. 4,787,454.

During the last decade, a few studies have focused on converting lignin to surfactants for the purpose of producing economical surfactant flooding systems for oil recovery. These studies have shown that lignin can be converted to water soluble surfactants and used in formulations for enhanced oil recovery chemical floods. The conversion of lignin into surfactants by reduction reactions and their use in chemical flood systems in EOR has been described previously. For instance, U.S. Pat. No. 4,739,040 describes a method of producing surfactants from lignin and is incorporated herein for all purposes. The method consists of reducing the lignin into a complex product mixture called lignin phenols in the presence of a carbon monoxide or hydrogen reducing agent at high temperature and pressure. It was determined that either kraft lignin or lignosulfonates could be reduced by either hydrogen or carbon monoxide in aqueous reactions and yield lignin phenol products. The lignin phenols can then be modified chemically to form water soluble surfactants by one or a combination of several chemical reactions such as alkoxylation, alkylation, sulfonation, sulfation, alkoxylation, and sulfomethylation. The lignin surfactants so produced can be used in surfactant flooding to recover hydrocarbons from underground formations as disclosed in U.S. Pat. No. 4,787,454, which is incorporated herein by reference for all purposes. Other chemical modifications have been developed to further modify the surfactant properties of the lignin phenol surfactants as disclosed in U.S. Pat. Nos. 5,095,985; 5,095,986; 5,230,814; and 5,035,288 and which are incorporated herein by reference for all purposes. For the most part, these chemical reductions have been previously done in aqueous systems. While this reaction system produces suitable products, there are two limitations. First, high pressures are generated because the reaction temperature is usually above the critical point of water (373° C.). Second, the presence of water limits the number of potential catalysts that can be used in the reaction. Because of these limitations, lignin reduction reactions have also been performed in organic solvents and particularly in hydrogen donor type solvents such as tetralin. As a result the reaction pressure is substantially less than the water based reaction. However, effective catalysts needed to be developed because of generally lower yields and poorer surfactant properties in the products.

The literature is replete with references disclosing the liquefaction of lignin with hydrogen in tetralin. Some of these references use various catalysts to promote or alter this reaction. In some of these references, the use of a catalyst in the hydrogenation of lignin in tetralin increased the yield of lignin phenols in the reaction. In addition, many references cite an increase in simple or low molecular weight aromatic products when a catalyst is used.

Schultz et. al. reported on the hydrotreatment of hydrochloric acid lignin in tetralin at about 400° C. Monomeric phenolic products were formed by the cleavage of the ether and the alkyl carbon alpha-beta bonds at a yield of about 11%. Demethylation of the methoxy groups was the dominant reaction occurring under thermal conditions. T. P. Schultz, R. J. Preto, J. L. Pittman, and I. S. Goldstein, J. Wood Chem. and Tech., 1982, 2, 17.

Vuori and Bredenberg reported on the liquefaction of kraft lignin using hydrogen in tetralin as the solvent. The maximum yield of ether soluble phenols and acids was reached when a tetralin/m-cresol mixture was used as the solvent. The main reaction was the demethylation of the methoxyl group leading to the formation of methane. However, high yields of char indicated the inability of both the gas phase hydrogen and the hydrogen from the donor solvent to prevent condensation reactions. Also, the use of a hydro treating catalyst failed to raise the yield of liquid products, instead it increased the amount of gas and char. A. Vuori and J. B. Son Bredenberg, Holzforschuncr, 1988, 42.

U.S. Pat. Nos. 3,105,095 and 3,223,698, assigned to the Noguchi Institute, disclose the catalytic liquefaction of lignin in a hydrogen stream and in a carrier solvent at a temperature of up to 450° C. The catalyst was a composite of iron, tin, copper and sulfur. Disclosed solvents included lignin tar, tetralin, phenols, oil from coal, gas oil, creosote oil and water. The primary object of the Noguchi process was to produce monomeric phenols from lignin to serve as raw materials in organic synthesis. These products are generally unsuitable for surfactants as their equivalent weights are too low.

Train and Klein reported the hydroprocessing of kraft lignin at 380° C. in a hydrogen stream over a composite sulfided cobalt oxide and molybdenum oxide catalyst supported on neutral alumina, having a weight ratio of molybdenum oxide to cobalt oxide of 2:1. The use of a sulfided catalyst composite of molybdenum oxide and nickel oxide supported on neutral alumina, having a weight ratio of molybdenum oxide to cobalt oxide of 5.9:1 in the hydroprocessing of o-hydroxydiphenylmethane was also disclosed. Use of this catalyst induced higher yields of single-ring products and lower yields of light gases compared to hydroprocessing without a catalyst. P. M. Train and M. T. Klein, Fuel Science and Technology, Int'l., 9(2), 193–227, 1991.

Meier et. al. disclosed the catalytic hydropyrolysis of different lignins under different conditions. The use of a composite nickel oxide and molybdenum oxide catalyst supported on zeolite produced oil at a yield of 17% which indicated that the lignin cracking products were unable to get to the active catalyst sites in the zeolite channels. A reaction solvent was not used in these reactions. D. Meier, R. Ante, and O. Faix, Biosource Technology, 1992, 40, 171.

U.S. Pat. No. 4,647,704 disclosed a process for producing monomeric phenols from lignin. The process used a composite of tungsten with a metal on a support. Mildly acidic supports, such as alumina, alumina-silica, aluminum phosphate, and silica-aluminum phosphate were described as being particularly effective. The use of the catalyst increased the yield of phenolic compounds in the hydrocracking of lignin. However, these type of products do not form effective surfactants.

Despite these references, the findings of the present patent disclosure have remained undetected. For instance, the improvement in surfactant properties of the sulfonated lignin phenols observed with the use of the catalyst systems of the present invention is totally unexpected based on the known literature.

SUMMARY OF THE INVENTION

The present invention is primarily directed to a method of producing surfactants from lignin, along with a method for recovering oil from underground formations by means of EOR systems containing lignin surfactants produced by the above method. Particularly, the invention relates to reducing lignin to lignin phenols in the presence of a catalyst in an organic solvent and converting the lignin phenols to lignin surfactants by one or a combination of several reactions such as alkoxylation, alkylation, sulfonation, sulfation, alkoxysulfation and sulfomethylation. More particularly, the invention involves reducing lignin to lignin phenol in the presence of a metal oxide or iron based catalyst, preferably a metal oxide catalyst, in a solvent, preferably a hydrogen donor organic solvent such as tetralin (tetrahydronaphthalene). The lignin phenol is recovered from the reaction mixture and chemically converted to lignin phenol surfactants. The use of these catalysts significantly improves the yield of lignin phenol in the reduction reaction. Also, the surfactant properties of the surfactants are dramatically improved.

In an embodiment of the present invention, lignin is converted into low molecular weight lignin phenol by placing lignin in contact with tetralin in the presence of a supported metal oxide catalyst. A reducing agent such as hydrogen is injected into the reaction vessel so as to blanket the reduction reaction mixture at an initial pressure of at least about 100 psig. The reduction reaction proceeds at high temperature and pressure in the presence of the metal oxide catalyst. Preferably, the metal oxide catalyst is a composite of molybdenum oxide and at least a second metal oxide. The second metal oxide is preferably cobalt oxide or nickel oxide and most preferably cobalt oxide. The preferred support is alumina. For the composite of molybdenum oxide with cobalt oxide, basic or neutral alumina support is more preferred and neutral alumina support is most preferred. For the composite of molybdenum oxide with nickel oxide, basic or neutral alumina is more preferred and basic alumina is most preferred.

The ratio of molybdenum oxide over the second metal oxide is important to the practice of this invention. Generally, it has been discovered that the metal oxide ratio influences the yield of the lignin reduction reaction and the surfactant properties of the lignin phenol surfactants. The weight ratio of molybdenum oxide to the second metal oxide component may range from about 2.1:1 to about 14.1:1, preferably from about 2.5:1 to about 8.1:1, and more preferably from about 3.1:1 to about 5.1:1 and most preferably from about 3.5:1 to about 4.5:1. For best results molybdenum oxide and cobalt oxide should be supported on neutral alumina at a ratio of molybdenum oxide to cobalt oxide of from about 3.7:1 to about 3.9:1, preferably of about 3.8:1.

In another embodiment of the present invention, the reduction reaction of the lignin phenol is performed in the presence of at least one iron based compound selected from the group consisting of iron sulfides, iron oxides and iron hydroxides. In a preferred embodiment using an iron based catalyst, the catalytic composition is a mixture of ferrous sulfide and smaller amounts of other metal sulfides. In a more preferred embodiment using an iron based catalyst, the catalytic composition used is the one resulting from mixing ferrous chloride, cupric sulfate, tin chloride, and sodium monosulfide in water.

Lignin phenol may be recovered from the reaction mixture with an organic solvent that is capable of solubilizing lignin phenol, such as benzene, toluene, tetrahydrofuran, ether or diethyl ether. Converting the lignin phenol into surfactants may be done by one or a combination of several reactions such as alkoxylation, alkylation, sulfonation, sulfation, alkoxysulfation, and sulfomethylation.

One aspect of the invention is directed to a lignin phenol surfactant made from the lignin phenol recovered from the reaction mixture of the aforementioned method and wherein the yield of lignin phenol is of at least about 40%, preferably of at least 60%, and most preferably of at least 65%. The lignin phenol surfactant of the invention has an interfacial tension that is less than about 2500 mdynes/cm, preferably less than about 600 mdynes/cm and most preferably less than about 300 mdynes/cm. Suitable catalysts for this invention are generally the ones capable of giving the yields and interfacial tensions mentioned above.

Another aspect of the invention involves a method for recovering hydrocarbons from an underground hydrocarbon formation penetrated by at least one injection well and at least one production well, which comprises injecting into the formation through an injection well a surfactant slug comprising about 0.1% to about 10% by weight of surfactants produced from lignin. The surfactants are produced by the method described above. A drive fluid is injected into the underground formation that pushes the surfactant towards a production well. Hydrocarbons are recovered at the production well.

It has, therefore, been discovered that by using suitable catalysts, the lignin reduction reaction can be performed in a hydrogen donor solvent such as tetralin producing high yields and good surfactant properties for the final lignin surfactants. Moreover, the reaction pressure, developed during the reduction reaction of the present invention method, is lower than about 2,500 psig while the pressure in prior water based systems is much higher, often times greater than about 8,000 psig. The combination of high yields, excellent surfactant properties and lower pressures makes the present invention method much more cost effective than existing processes.

BRIEF DESCRIPTION OF THE DRAWINGS

FIG. 5 depicts a plot of % oxygen versus molecular weight for the lignin phenol products prepared with the metal oxide catalysts in Table 2.

DETAILED DESCRIPTION

Figure 1:
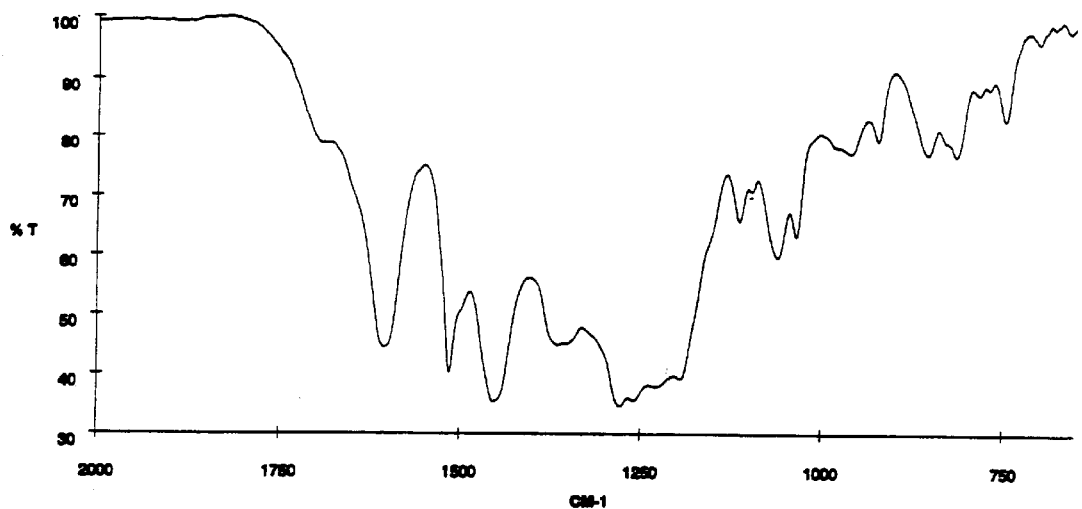
FIG. 1 depicts two FTIR spectra of lignin phenol products prepared from. Indonesian JHW lignin. The top spectra is for a product prepared using water/CO. The bottom spectra is for a product prepared using tetralin/hydrogen.
Figure 1:
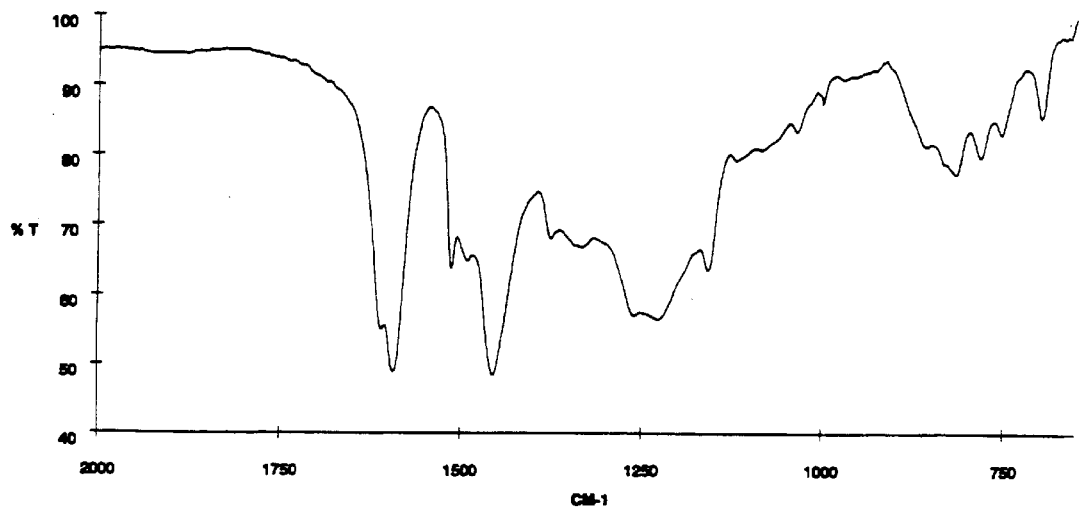

Lignin, produced in a pulp mill as either Kraft lignin or lignosulfonate, has a high molecular weight from about 3,000 to about 15,000 g/mol and a high oxygen content from about 20 to about 30% by weight oxygen. The initial structure can be described as a very complex polymer of phenylpropane monomer units linked by oxygen atoms. Empirical formulas can be written that depict the average composition of lignin in terms of the phenylpropane units. These average formulas are shown below for Kraft lignin and for lignosulfonate.

Kraft lignin: $C_9H_{6.7}O_{2.2}S_{0.1}(OCH_3)_{0.90}$ lignosulfonate: $C_9H_{8.2}O_{2.6}(OCH_3)_{0.94}$ For the lignosulfonate formula, the sulfonate groups ($-SO_3$) have been omitted in order to see the number of oxygens in lignin. Both lignin and lignosulfonates may be used in the instant process to prepare the lignin surfactants. Regardless of the starting material, the reduction reaction degrades the lignin polymeric structure to its simpler repeating units and in the case of lignosulfonate also severs the sulfonate radical. The high temperature reduction of lignin to produce lignin phenol is a combination of polymer degradation, deoxygenation and hydrogenation. The basic monomer unit of the lignin remains intact although the polymer network of lignin has been significantly degraded. The average of the chemical analyses of several lignin phenol products shows the result of the lignin reduction reaction. This is shown below in a nine carbon atom empirical formula.

lignin phenol (average): $C_9H_{10.6}O_{0.80}S_{0.03}(OCH_3)_{0.02}$

The amount of hydrogen in lignin phenol has increased relative to the initial values in lignin while the amount of oxygen (and methoxy groups) has been substantially reduced. Analysis of the lignin phenol product of the instant process indicates that phenolic compounds comprise at least about 90% by weight of the product mixture, preferably at least 96% by weight of the product mixture. It is believed that the lignin phenol product is composed of two, three, four or more propane phenols linked or fused together plus assorted methoxyls, hydroxyls and other oxygens. Whenever the phrase "lignin phenol" is used herein, it refers to the above product mixture and not only propane phenol.

Reaction Procedure

The reduction reaction is performed by placing the lignin in contact with a hydrogen donor organic solvent in the presence of a catalyst. The solvent is selected from the group consisting of aromatic refinery streams such as vacuum gas oils or vacuum bottoms, oil obtained from the liquifaction of biomass (wood or lignin), recycled lignin phenol, and organic solvents such as tetralin. Preferably the solvent is an hydrogen donor organic solvent and most preferably tetralin. The reaction is performed within a high pressure vessel so as to carry the reaction at a temperature greater than about 200° C., preferably at a temperature ranging from about 300° C. to about 550° C. and at a pressure of at least about 100 psig, preferably of at least about 500 psig. Typically, the reaction pressure developed during the reduction reaction is lower than about 2,500 psig. This is a significant advantage over existing water based processes which operate at much higher reaction pressures, often times as high as 8,000 psig or even higher. The lignin may be dissolved or slurried in the solvent at concentrations ranging from about 5% to about 50% by weight, preferably from about 10% to about 20% by weight.

The catalyst used is selected to increase the yield of lignin phenol and to improve the interfacial tension property of the surfactants that are made from the lignin phenol. Suitable catalysts for the practice of this invention are the ones that provide a yield of lignin phenol of at least 50% by weight based on the amount of lignin fed to the reactor and a lignin phenol product which can be converted to a sulfonated lignin phenol surfactant having an interfacial tension of less than about 1500 mdynes/cm. Preferred catalysts are the ones that provide a yield of at least 60% by weight and a sulfonated lignin phenol product having an interfacial tension of less than 600 mdynes/cm, and most preferred are the ones that provide a yield of at least 65% by weight and a sulfonated lignin phenol product of less than 300 mdynes/cm. The interfacial tension is measured in 2% solution in Illinois Well Supply Water having a content of about 35,000 ppm total dissolved solids (TDS) against Salem crude oil having a viscosity of about 3 to 5 centipoise. The amount of catalyst added may range from about 1% to about 30%, preferably ranging from about 5% to about 15%, of the lignin by weight, for example, about 11% of the lignin by weight.

A reducing agent is injected into the reaction vessel to blanket the reaction mixture at an initial pressure of at least about 100 psig, preferably of at least about 500 psig. The reducing gas is preferably carbon monoxide, hydrogen, hydrogen sulfide or a mixture thereof. In general, the reduction reaction is allowed to proceed at reaction temperature and pressure for a period of from about 30 minutes to about 5 hours.

In one embodiment of the present invention, the catalyst contains from about 1% to about 50%, preferably from about 2% to about 30%, and most preferably from about 5% to about 15%, by weight molybdenum oxide. The catalyst also contains a second metal oxide component, preferably nickel oxide or cobalt oxide and most preferably cobalt oxide. The weight ratio of molybdenum oxide to the second metal oxide component may range from about 2.1:1 to about 14.1:1, preferably from about 2.5:1 to about 8.1:1, and more preferably from about 3.1:1 to about 5.1:1 and most preferably from about 3.5:1 to about 4.5:1. For best results molybdenum oxide and cobalt oxide should be supported on neutral alumina at a ratio of molybdenum oxide to cobalt oxide of from about 3.7:1 to about 3.9:1, preferably of about 3.8:1. It has been found that the weight ratio of the molybdenum oxide to the second metal oxide has a significant effect not only on the yield of lignin phenol but also on the properties such as the interfacial tension (IFT) of the sulfonated surfactant product. It is understood, however, that the invention is not limited to the above mentioned ranges and that the optimum range for the metal oxide ratio would vary based on a number of factors including the type of the second metal oxide component and the type of the support used.

The catalyst support can be any of the group consisting of a crystalline zeolite described in U.S. Pat. No. 3,702,886, mixed titanium aluminum oxide described in Haynes, Jr., H. W., *Improved Catalysts for Coal Liquefaction*, DE 88010547, 1988, basic alumina, neutral alumina and acidic alumina. The preferred support is alumina. For the composite of molybdenum oxide with cobalt oxide, basic or neutral alumina support is more preferred and neutral alumina support is most preferred. For the composite of molybdenum oxide with nickel oxide, basic or neutral alumina is more preferred and basic alumina is most preferred. Other supports such as a crystalline zeolite and a mixed titanium aluminum oxide can be used with yields that are comparable to the alumina supported catalysts, but with generally higher IFT values for the sulfonated lignin phenol surfactants.

The metal oxide catalysts can be prepared by loading or coating the corresponding metal salt on the catalyst support. For example, in one embodiment, effective amounts of ammonium molybdate, cobalt chloride, or nickel nitrate were dissolved in water at about 50° C. The support was added, and the overall mixture was stirred with heat for about 30 minutes to 1 hour. The water was stripped from the mixture and the solids were collected, dried, ground and calcined at 500° C. for 6 hours under a constant air flow. The actual metal oxide content of the catalyst was determined by atomic absorption analysis.

Other embodiments of the present invention include the use of iron based catalysts. These catalysts are shown in Table 5. Generally, they include iron oxides, iron sulfides and supported iron oxide catalysts on commercial grades of gamma-alumina. In an embodiment of the present invention that is using an iron based catalyst the reduction reaction of the lignin phenol is performed in the presence of an iron based catalyst selected from the group consisting of iron sulfides, iron oxides, and iron oxides or iron hydroxides mixed with sulfur, inorganic sulfur compounds or organic sulfur compounds.

In a preferred embodiment using an iron based catalyst, the catalytic composition is a mixture of ferrous sulfide and smaller amounts of other metal sulfides formed preferably in situ by adding for example a sulfide source such as sodium monosulfide to an aqueous solution of a water soluble mixture of a divalent iron salt and a water soluble salt of one or more metals as including copper, tin, silver, chromium, cobalt, nickel, zinc, molybdenum, gallium, and germanium, preferably salts of copper and tin. The catalytic composition is preferably prepared in the presence of a lower aliphatic alcohol. This catalyst is described in U.S. Pat. No. 4,731,491, which is incorporated herein by reference for all purposes. In a more preferred embodiment, the catalytic composition used is the one resulting from mixing ferrous chloride, cupric sulfate, tin chloride, and sodium monosulphide in water. Moreover, phenol may be added during the reduction reaction which acts as a solvent and a liquefying aid.

These iron based catalysts improve both the yield of the reduction reaction and the IFT values of the surfactant products when compared to the uncatalyzed reaction. However, while these yields are generally comparable to the yield of lignin phenol from the metal oxide catalyzed reactions, the IFT values are generally higher. The iron based catalysts generally produce lignin phenol products with a higher percentage of oxygen (Table 8) than the products produced by the cobalt and molybdenum catalysts.

Lignin Phenol Isolation Procedure

After the reaction, the lignin phenol product is isolated by dissolution in tetrahydrofuran (THF) and filtration. THF and the hydrogen donor solvent, e.g., tetralin, is removed by stripping and vacuum distillation. Briefly, at the end of the reduction reaction, THF is added to the reactor to help rinse out all of the product. Then the tetralin and THF wash solutions are combined and filtered to remove any unreacted solids. These THF insoluble solids are re-slurried in THF and filtered again. Any water present in the product which was formed during the reaction is separated from the THF soluble filtrate. Sodium chloride is added to "salt out" water present in the THF/tetralin mixture. The THF/tetralin filtrate solution is dried with 4A molecular sieves and filtered again. The THF is removed from the solution by vacuum stripping. This yields a mixture of lignin phenol product and tetralin. The tetralin is removed from the lignin phenol product by vacuum distillation.

After distillation, the remaining material is refluxed with hexane to remove residual tetralin from the final lignin product. The refluxes are continued until FTIR spectra of the hexane extracts is free of tetralin. The hexane washes and distilled tetralin are extracted with 5% sodium hydroxide to recover low molecular weight lignin phenols that distilled over with tetralin. The aqueous extracts are adjusted to pH 7 (or below) with, for example, 50% hydrochloric acid and then extracted with a water-immiscible organic solvent, preferably a water-immiscible organic solvent having a sufficiently low boiling point, such as hexane, toluene, and ether, most preferably ether because of its very low boiling point. The ether soluble extracts are combined with the THF soluble lignin phenol product. This product is dried over molecular sieves and vacuum stripped to remove the THF before using the lignin phenol in subsequent reactions. The THF insoluble fraction contains charred lignin and catalyst. A portion of this product is ashed to determine the amount of recovered catalyst. Typically all of the catalyst is recovered.

The resulting lignin phenol may be converted to water soluble surfactants by reactions such as sulfonation, sulfation, alkoxylation, alkylation, sulfomethylation, and alkoxysulfation. Further details as to these reactions may be found in U.S. Pat. Nos. 4,739,040 and 4,787,454, which are incorporated herein by reference for all purposes. Also, U.S. Pat. No. 5,230,814, incorporated herein by reference for all purposes, discloses a method for transforming lignin phenol into an oil soluble surfactant by alkoxylating at a phenolic site. Such surfactants are useful in chemical flooding EOR operations.

Surfactant Flooding Systems

The invention also includes the injection of a surfactant flooding system into a reservoir to recover underground hydrocarbons, where the surfactant flooding system contains lignin surfactants produced by the above described process. Depending upon the surfactant formulation, some of these surfactants may be employed as sole surfactants, co-surfactants or solubilizers in a surfactant flooding system. They may also be used to substitute for a certain percentage of an existing surfactant in a surfactant flooding system to lower the overall costs of the surfactants employed in the flooding system. Many of the lignin surfactants produced according to the above described process of the present invention provide low interfacial tensions between oil and water, and form stable surfactant systems with many of the commercially available enhanced oil recovery surfactants now on the market.

It is well-known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to about 25% of the pore volume of the reservoir with a total surfactant and solubilizer concentration of about 0.1% to about 10% by weight. Surfactant slugs having greater than about 25% of the volume of the reservoir are technically feasible but are not preferred because of economic reasons. A typical surfactant system may be:

I. one or more petroleum sulfonates such as
  1. a water soluble sulfonate having a relatively low equivalent weight, or
  2. an oil soluble sulfonate having a relatively high equivalent weight, or
  3. any other commercially available petroleum sulfonates;
II. a solubilizer or cosurfactant;
III. brine; and
IV. optionally, a light hydrocarbon.

As mentioned before, surfactant flooding systems can be formulated under some conditions without a solubilizer and with only a single surfactant. Other components may be blended into the surfactant slug. Petrochemical and synthetic sulfonates may be substituted for petroleum sulfonates. The surfactant slug may also be preceded by a sacrificial agent, or contain viscosity improving polymers and/or a sacrificial agent.

Of course, not every combination of components will yield a stable and active surfactant system. Surfactant systems may be stable or unstable and have varying degrees of surfactant activity depending upon the specific lignin surfactants, other surfactants, solubilizer and brine employed in a particular system. It is well-known in the art that each surfactant system must be tested. One cannot rely upon generalities as to stability or surfactant activity in multi-component surfactant systems.

The present invention resides in the use of from about 0.1% to about 10% concentration by weight of lignin surfactants in any surfactant flooding system to recover underground hydrocarbons, wherein the lignin surfactants are prepared according to the described process of the present invention. Additional surfactants other than the lignin surfactants of the present invention may be included in the surfactant flooding systems.

Surfactant systems are generally pushed through the formation towards a production well by the subsequent injection of a drive fluid. The drive fluid is usually water, gas or water viscosified by a polymer. Hydrocarbons and other fluids are then recovered at one or more production wells.

The following examples will further illustrate the present invention which discloses a catalytic method for producing surfactants from lignin and employing such lignin surfactants in surfactant flooding systems. These examples are given by way of illustration and not as limitations on the scope of the invention. Thus, it should be understood that reaction steps and amounts may be varied with the process still remaining within the scope of the present invention.

EXAMPLES

The lignin used in the reduction reactions was INDULIN AT™, a purified softwood Kraft lignin from pine. This lignin is supplied by Westvaco Corp. and is sold in a purified form of 97% lignin. The principle reaction solvent for the reduction reactions was tetralin. Tetralin has been used extensively in coal liquefaction studies as a hydrogen atom donor solvent. For example see Song, C., Schobert, H. H., and Hatcher, P. G. Energy and Fuels, 6, 1992, p. 328–330; and Besson, M. et. al., Fuel, 69, 11990, p. 35–43.

Examples 1–14

Table 1 lists 14 reduction reactions of INDULIN AT™ with hydrogen in/tetralin. Example 1 lists an uncatalyzed reaction used as control. The product of Example 2 was prepared with uncoated alumina. In the remaining reactions, INDULIN AT™ was reduced in the presence of a metal oxide catalyst. The general procedure was to react 105 grams of the dried lignin in 300 ml of tetralin with 1000 psig hydrogen in the presence of 12 grams of a metal oxide catalyst.

After the lignin solution and catalyst were placed in a one-gallon reactor, the reactor was pressurized with hydrogen to an initial pressure of about 1000 psig. The reactor was then heated to about 410° C. The reaction mixture was held at 410° C. for about thirty minutes, and then allowed to cool. Hydrogen consumption was determined by the decrease in reactor pressure.

After reaction, the lignin phenol product was isolated by dissolution in THF and filtration. The THF and tetralin were removed by stripping and vacuum distillation. Briefly, at the end of the reduction reaction, THF was added to the reactor to help rinse out all of the product. Then the tetralin and THF wash solutions were combined and filtered to remove any unreacted solids. These THF insoluble solids were re-slurried in THF and filtered again. Any water present in the product which was formed during the reaction was separated from the THF soluble filtrate. Sodium chloride was added to "salt out" water present in the THF/tetralin mixture. The THF/tetralin filtrate solution was dried with 4A molecular sieves and filtered again. The THF was removed from the solution by vacuum stripping. This yields a mixture of lignin phenol product and tetralin. The tetralin was removed from the lignin phenol product by vacuum distillation.

After distillation, the remaining material was refluxed with hexane to remove residual tetralin from the final lignin product. The refluxes were continued until FTIR spectra of the hexane extracts was free of tetralin. The hexane washes and distilled tetralin were extracted with 5% NaOH to recover low molecular weight lignin phenols that distilled over with tetralin. The aqueous extracts were adjusted to pH 7 (or below) with, for example, 50% hydrochloric acid and then extracted with ether. Other low boiling point organic solvents such as hexane and toluene may be substituted for ether in this procedure. The ether soluble extracts were combined with the THF soluble lignin phenol product. This product was dried over molecular sieves and vacuum stripped to remove the THF before using the lignin phenol in subsequent reactions. The THF insoluble fraction contained charred lignin and catalyst. A portion of this product was ashed to determine the amount of recovered catalyst. Typically all of the catalyst was recovered.

The isolated product was then analyzed and converted to the lignin phenol sulfonate by reaction with a dioxane-sulfur trioxide complex and according to the reaction procedure provided in U.S. Pat. No. 4,739,040, incorporated herein by reference for all purposes. Of course, other methods for sulfonation, as well as other reactions, can be employed in order to convert the lignin phenol into a surfactant which are disclosed in the aforementioned patent and incorporated herein by reference for all purposes.

The sulfonated lignin phenols were formulated as 2% product solids in synthetic field brine. The brine used in the formulations had a salinity of about 35,000 ppm total dissolved solids (TDS) and a divalent ion concentration of calcium and magnesium of about 560 ppm. The exact brine composition was:

Brine Composition (WSW, well supply water)

$Mg^{+2}$=0.210 g/l $Ca^{+2}$=0.346 g/l $Na^{+}$=12.67 g/l $Cl^{-}$=18.89 g/l $SO_4^{-2}$=2.53 g/l

Total=34.65 g/l (34650 ppm TDS)

IFT measurements were made versus Robinson and Salem crude oils. The Robinson oil is a U.S. Mid-Continent crude oil with an average API gravity of about 33°. The Salem oil is also a U.S. mid-continent crude having an average API gravity of about 36°.

Table 1 lists the yields of these reactions, the molecular weight of the lignin phenol, and the interfacial tension values of the lignin phenol sulfonates. The "% Yield" refers to the weight percent yield of lignin phenol based upon the weight of lignin charged to the reactor. The "% Mass Balance" refers to the percentage of total organic material recovered from the lignin charged to the reactor. The mass balance includes recovered "charred" lignin and lignin phenol. This "mass balance" is a determination of the amount of material that can be accounted for after the reaction. For instance, a mass balance of 95% means that 5% of the material is not accounted for. It was presumably converted to gas or water. The percent yield of lignin product in Table 1 was adjusted to account for the lignin content of the starting lignin. For instance in example 5, 62.2 gms of lignin phenol product was isolated from the product of reduction of 105 grams of INDULIN AT™. As INDULIN AT™ is 97% lignin, the 105 grams of INDULIN AT™ corresponds to 101.9 grams of Kraft lignin. The percent yield is then 58.6 grams divided by 101.9 grams, or 61%.

These examples show that the use of metal oxide catalysts according to the present invention leads to sulfonated products with better interfacial tension (IFT) than the product from the uncatalyzed reaction. In addition, the catalyzed reactions give higher yields of the lignin phenol products than the uncatalyzed reaction. The product in example 2, prepared with uncoated basic alumina as the catalyst, also gave a high yield of lignin phenol, however, the IFT of the sulfonated lignin phenol was high. This clearly shows that the metal oxide loading of the catalyst plays an essential role in the reduction reaction.

Previous studies on the reduction of lignin in water systems have shown that generally lignin phenols with lower molecular weights lead to sulfonated surfactants with lower IFT. In contrast, examples 1–14 illustrate that there is not a similar correlation between the IFT of the sulfonated product and molecular weight of the lignin phenol made with the catalyzed reactions. Specifically, Table 1 shows that a spread in molecular weight values was obtained and low IFT values were produced from the lignin phenol with the highest molecular weight. This lack of correlation is unexpected, and has been observed for all of the catalyzed lignin reductions in tetralin.

The results in Table 1 also show that all of the alumina supports give comparable yields of lignin phenol. However, for a given metal oxide loading, the IFT values are dependent on the nature of the support and the metal oxide ratio. For instance, for the CoMo catalyst, lower IFT values were obtained with the neutral alumina support. For the NiMo oxide catalyst, the basic and neutral alumina supports gave generally lower IFT values and better yields than the acidic support.

These examples also illustrate that the weight ratio of molybdenum oxide to the second metal oxide component affects the yield of lignin phenol and the IFT's of the sulfonated product. The highest yields were achieved at a metal oxide ratio of from about 3.5:1 to about 4.5:1. For catalysts with either a higher or lower metal oxide ratio, the yield of lignin phenol were lower. In addition, generally, the lowest IFT values were obtained for both the CoMo and the NiMo catalysts at metal oxide ratio of the molybdenum oxide to the second metal oxide of about 3.7:1 to about 3.9:1.

TABLE 1

LIGNIN PRODUCTS FROM INDULIN AT ™
EFFECT OF METAL OXIDE CATALYSTS[1]

| | | Lignin Phenol | | | IFT's, mdynes/cm[2] | |
| --- | --- | --- | --- | --- | --- | --- |
| Example | Catalyst | % Yield | Mass Balance, % | Mol Wt, g/mol | Robinson | Salem |
| 1 | none | 52 | 52 | 290 | 1620 | 2380 |
| 2 | b-$Al_2O_3$ | 64 | 67 | 310 | 1950 | 2340 |
| 3 | NiMo/b-$Al_2O_3$, r[3] = 12.9 | 53 | 59 | 370 | 190 | 490 |
| 4 | NiMo/a-$Al_2O_3$, r = 12.5 | 51 | 54 | 370 | — | — |
| 5 | NiMo/b-$Al_2O_3$, r = 4.3 | 61 | 64 | 300 | 160 | 270 |
| 6 | NiMo/n-$Al_2O_3$, r = 3.7 | 61 | 64 | 310 | 100 | 250 |
| 7 | CoMo/b-$Al_2O_3$, r = 13.2 | 49 | 53 | 400 | 190 | 580 |
| 8 | CoMo/a-$Al_2O_3$, r = 12.7 | 52 | 56 | 440 | — | — |
| 9 | CoMo/b-$Al_2O_3$, r = 3.7 | 69 | 74 | 280 | 370 | 690 |
| 10 | CoMo/n-$Al_2O_3$, r = 3.8 | 69 | 72 | 280 | 70 | 110 |
| 11 | CoMo/a-$Al_2O_3$, r = 6.4 | 61 | 66 | 230 | 480 | 1430 |
| 12 | CoMo/b-$Al_2O_3$, r = 2.0 | 61 | 66 | 380 | 1280 | 1950 |
| 13 | CoMo/n-$Al_2O_3$, r = 2.2 | 57 | 63 | 340 | 1390 | 2190 |
| 14 | CoMo/a-$Al_2O_3$, r = 2.0 | 57 | 61 | 310 | 520 | 1380 |

[1]Reactions done in tetralin with initial pressure at 1000 psig $H_2$ at a temperature at 410° C.
[2]IFT's of sulfonated lignin phenols measured as 2% solutions in Illinois Well Supply Water (34,400 ppm TDS) against the indicated crude oil.
[3]"r" is the ratio of molybdenum oxide to the second metal oxide component.

Chemical Characterization of Lignin Phenol Products

Using elemental microanalysis, the lignin phenol products were determined to consist of carbon, hydrogen, and oxygen. Elemental Microanalysis refers to a combustion procedure used to determine the content of, for example, carbon, oxygen and hydrogen in a sample. Standard procedures were used for the analysis of sulfur, methoxyl ($OCH_3$) and weak acids (PhOH and COOH). The weak acid titrations were performed in DMSO using tetra-n-butylammonium hydroxide as the titrant. The number average molecular weight, $M_n$, was determined by vapor pressure osmometry (VPO) in THF at 45° C.

The results of the chemical analysis of the lignin phenol products formed from the CoMo and NiMo catalysts are listed in Table 2. The analysis of the unreacted lignin, i.e., INDULIN AT™, is included for comparison. The equivalent weight is the inverse of the sum of the phenyl hydroxyl and the carboxylic acid values. Generally, lignin phenols prepared with tetralin gave lower equivalent weights than the lignin phenols prepared in aqueous reductions.

TABLE 3

$C_9$ Empirical Formulas of Lignin Phenol Products from CoMo and NiMo Catalysts

| Example No. | Catalyst | C | H | O | S | $OCH_3$ |
|---|---|---|---|---|---|---|
| 1 | none | 9 | 9.2 | 0.61 | 0.01 | 0.00 |
| 2 | b-$Al_2O_3$ | 9 | 7.8 | 1.00 | 0.02 | 0.03 |
| 3 | NiMo/b-$Al_2O_3$, r = 12.9 | 9 | 9.0 | 0.88 | 0.01 | 0.03 |
| 4 | NiMo/a-$Al_2O_3$, r = 12.5 | 9 | 9.0 | 0.85 | 0.01 | 0.02 |
| 5 | NiMo/b-$Al_2O_3$, r = 4.3 | 9 | 9.8 | 1.05 | 0.00 | 0.01 |
| 6 | NiMo/n-$Al_2O_3$, r = 3.7 | 9 | 9.6 | 0.92 | 0.00 | 0.01 |
| 7 | CoMo/b-$Al_2O_3$, r = 13.2 | 9 | 9.1 | 0.82 | 0.01 | 0.02 |

TABLE 2

Analytical Data of Lignin Phenol Products from CoMo and NiMo Catalysts

| Example No. | Catalyst | % C | % H | % O | % S | % OCH | PhOH meq/g | COOH meq/g | Eq Wt | Mol Wt |
|---|---|---|---|---|---|---|---|---|---|---|
| 1 | none | 83.79 | 7.17 | 7.53 | 0.31 | n.d. | 3.63 | 0.27 | 257 | 291 |
| 2 | b-$Al_2O_3$ | 77.07 | 5.64 | 11.75 | 0.37 | 0.66 | 3.95 | 0.27 | 237 | 308 |
| 3 | NiMo/b-Al2O3, r = 12.9 | 80.91 | 6.85 | 10.70 | 0.22 | 0.45 | 3.82 | 0.13 | 253 | 366 |
| 4 | NiMo/a-Al2O3, r = 12.5 | 81.14 | 6.87 | 10.47 | 0.21 | 0.14 | 4.17 | 0.17 | 230 | 368 |
| 5 | NiMo/b-Al2O3, r = 4.3 | 79.17 | 7.27 | 12.38 | 0.00 | 0.27 | 4.45 | 0.19 | 216 | 296 |
| 6 | NiMo/b-Al2O3, r = 3.7 | 79.47 | 7.16 | 11.00 | 0.00 | 0.30 | 4.59 | 0.21 | 208 | 314 |
| 7 | CoMo/b-Al2O3, r = 13.2 | 81.23 | 6.94 | 10.15 | 0.22 | 0.57 | 3.64 | 0.18 | 262 | 397 |
| 8 | CoMo/b-Al2O3, r = 12.7 | 71.47 | 6.87 | 9.98 | 0.33 | 0.56 | 3.89 | 0.26 | 241 | 436 |
| 9 | CoMo/b-Al2O3, r = 3.7 | 78.40 | 7.39 | 12.05 | 0.06 | 0.61 | 4.67 | 0.25 | 202 | 279 |
| 10 | CoMo/n-Al2O3, r = 3.8 | 79.39 | 7.69 | 11.97 | 0.00 | 0.48 | 4.50 | 0.23 | 211 | 284 |
| 11 | CoMo/a-Al2O3, r = 6.4 | 78.61 | 7.10 | 13.02 | 0.19 | 0.62 | 4.24 | 0.27 | 222 | 232 |
| 12 | CoMo/b-Al2O3, r = 2.0 | 78.08 | 6.42 | 10.33 | 0.30 | 0.55 | 4.00 | 0.27 | 234 | 382 |
| 13 | CoMo/n-Al2O3, r = 2.2 | 79.11 | 6.19 | 11.14 | 0.35 | 0.62 | 4.05 | 0.29 | 230 | 344 |
| 14 | CoMo/a-Al2O3, r = 2.0 | 78.62 | 6.97 | 11.53 | 0.24 | 0.45 | 4.06 | 0.23 | 233 | 309 |
| unreacted INDULIN AT ™ | | 65.53 | 5.80 | 26.29 | 1.12 | 13.40 | 2.01 | 1.74 | — | — |

The data in Table 2, also show that extensive loss of oxygen and de-methoxylation has occurred for all of the catalysts used in the reactions. Table 2 also shows that a correlation exists between the oxygen content and the molecular weight of the lignin phenol. The relationship between molecular weight and oxygen content is shown in FIG. 5 and can possibly be explained by the following mechanism. Accordingly, during the lignin reduction reaction deoxygenation occurs by a free radical mechanism. When an oxygen atom is removed from the lignin, the intermediate free radical can either abstract a hydrogen atom or couple with another radical and form a larger product molecule with higher molecular weight. Increased deoxygenation during the reaction increases the possibility for the formation of high molecular weight products. This could possibly account for the observation that lower oxygen content leads to higher molecular weight lignin phenol products.

The elemental and methoxy analyses were converted to empirical formulas based on $C_9$ units, the phenyl propane monomer unit of lignin. The formulas are given in Table 3. For comparison, the statistical formula for unreacted INDULIN AT™ (noted as Example 1) is also given.

TABLE 3-continued $C_9$ Empirical Formulas of Lignin Phenol Products from CoMo and NiMo Catalysts

| Example No. | Catalyst | C | H | O | S | $OCH_3$ |
|---|---|---|---|---|---|---|
| 8 | CoMo/a-$Al_2O_3$, r = 12.7 | 9 | 9.0 | 0.81 | 0.01 | 0.02 |
| 9 | CoMo/b-$Al_2O_3$, r = 3.7 | 9 | 10.01 | 1.01 | 0.00 | 0.03 |
| 10 | CoMo/n-$Al_2O_3$, r = 3.8 | 9 | 10.3 | 1.00 | 0.00 | 0.02 |
| 11 | CoMo/a-$Al_2O_3$, r = 6.4 | 9 | 9.6 | 1.09 | 0.01 | 0.03 |
| 12 | CoMo/b-$Al_2O_3$, r = 2.0 | 9 | 8.8 | 0.87 | .01 | 0.02 |
| 13 | CoMo/n-$Al_2O_3$, r = 2.2 | 9 | 8.3 | 0.93 | 0.01 | 0.03 |
| 14 | CoMo/a-$Al_2O_3$, r = 2.0 | 9 | 9.5 | 0.97 | 0.01 | 0.02 |
| Unreacted INDULIN AT ™ | | 9 | 7.99 | 2.17 | 0.06 | 0.72 |
| Unreacted Indonesian-JHW | | 9 | 7.34 | 2.39 | 0.11 | 0.92 |

The empirical formulas in Table 3 reflect the extensive demethoxylation that has occurred in the reaction (for instance for the INDULIN AT™, from 0.77 down to about 0.03). Generally, the oxygen content has been reduced to less than half of the original amount in all the lignin phenol products.

Examples 15–18

In addition to alumina, two other catalyst supports were examined in the reduction reaction, a zeolite (ZSM-5) and a mixed titanium aluminum oxide ($TiAlO_x$). A non-supported molybdenum oxide catalyst (MoO$_4$), was also evaluated. INDULIN AT™ was impregnated with 0.03% by weight of lignin ammonium molybdate ((NH$_4$)$_6$Mo$_7$O$_{24}$.4H$_2$O) prior to reaction. The reaction results are shown in Table 4.

Generally, with an exception for the NiMo catalyst of Example 15, the metal oxides on the other supports (Examples 16 and 17) did not perform as well as the catalysts supported on alumina. The yields were comparable to the yields obtained with the alumina supported metal oxide catalysts, but the IFT values for the sulfonated lignin phenols were generally higher. Similarly, the unsupported MoO$_4$ catalyst gave a good yield but generally higher IFT values than those from the alumina supported metal oxide catalysts.

TABLE 4

Lignin Products in Tetralin
Effect of Different Supports[1]

| | | | Lignin Phenol | | IFT's, mdynes/cm$^2$ | |
|---|---|---|---|---|---|---|
| Example | Catalyst | % Yield | Mass Balance, % | Mol Wt, g/mol | Robinson | Salem |
| 15 | NiMo/TiAlO$_x$, r = 2.9 | 62 | 65 | 450 | 190 | 420 |
| 16 | CoMo/2SM-5, r = 4.5 | 67 | 71 | 320 | 320 | 1130 |
| 17 | CoMo/TiAlO$_x$, r = 2.0 | 69 | 78 | 370 | 910 | 1660 |
| 18 | MoO$_4$ | 65 | 88 | 360 | 710 | 910 |

[1]Reactions done in tetralin with an initial pressure of 1000 psig H$_2$ at a temperature of 410° C.
[2]IFT's of sulfonated lignin phenols measured as 2% solutions in Illinois Well Supply Water (35,000 ppm TDS) against the indicated crude oil.

Examples 19–32

Eight iron based catalysts were used for the preparation of lignin products from INDULIN AT™. These catalysts are listed in Table 5. The reduction reaction procedure and product isolation were generally identical to the ones described above.

TABLE 5

Iron Based Catalysts Used in Lignin Reductions

| Example | Catalyst | Catalyst Amount, %[1] | Reaction Temp, ° C. |
|---|---|---|---|
| 19 | Phenol | 14 | 350 |
| 20 | Fe(II)S | 5 | 350 |
| 21 | Fe(II)S | 5 | 410 |
| 22 | FeCl$_2$, CuSO$_4$, SnCl$_2$ Na$_2$S Phenol | 15 6.3 14 | 410 |
| 23 | Fe(II)S, CuS, Sn$_2$S | 11 | 410 |
| 24 | Fe(IV)S$_2$ | 5 | 410 |
| 25 | Fe$_2$O$_3$/SO$_4$= | 0.57 | 410 |
| 26 | impregnated FeSO$_4$ | — | 410 |
| 27 | Fe$_2$O$_3$/basic Al$_2$O$_3$ | 11 | 410 |
| 28 | Fe$_2$O$_3$/basic Al$_2$O$_3$ | 11 | 410 |
| 29 | Fe$_2$O$_3$/basic Al$_2$O$_3$ | 11 | 410 |
| 30 | Fe$_2$O$_3$/acidic Al$_2$O$_3$ | 11 | 410 |

[1]Percentage is based on amount of catalyst relative to the weight of lignin charged to the reactor.

As the following discussion notes, these iron based catalysts have been used generally in coal liquefaction processes and in some instances, in the liquefaction of lignin. However, up to the present invention none of these catalysts had been used for the preparation of lignin phenol surfactants.

Specifically, example No. 19 is an uncatalyzed reaction that used phenol as a co-reactant to serve as a control for the reaction of example 22 which used phenol as one of the reactants. Examples 20 and 21 used an iron (II) sulfide catalyst, Fe(II)S. Iron pyrites have been used in the liquefaction of coal. See Trewhella, M. J., and Grint, A., Fuel, 1987, 66, 1315. Example No. 22 used a mixture of FeCl$_2$, CuSO$_4$, SnCl$_2$ and Na$_2$S (mixed with water first). The reaction conditions included using phenol as an added reactant during the reaction. These type of catalysts have been used in the liquefaction of lignin as described in U.S. Pat. No. 4,731,491 assigned to UOP Inc. Example No. 23 used a catalyst composed of iron, tin, copper, and sulfur. Similar catalysts were used in the Noguchi process for the liquefaction of lignin. U.S. Pat. Nos. 3,105,095 and 3,223, 698. Example No. 24 used an iron sulfide catalyst, Fe(IV)S$_2$. This catalyst was used in coal liquefaction and found to convert about 80% of coal to a benzene soluble fraction. See, Kotanigawa, T., Yokoyama, S., Yamamoto, M., and Maekawa, Y., Fuel, 1989, 68, 618. The product fraction consisted of aromatics with short side chains. Also described in this publication is the sulfated iron oxide catalyst that was used in reaction no. 25. It was reported to give a high yield of benzene soluble fraction in coal liquefactions. Example No. 26 used a sulfated iron oxide, Fe$_2$O$_3$/SO$_4$=, impregnated on the lignin at a concentration of 0.57%. This catalyst has been reported for coal liquefaction when used in small concentrations (<0.4 wt % Fe) at 400° C. and 1000 psig H$_2$ in tetralin. See, Pradhan, V. R., Tierney, J. W., Wender, I., and Huffman, G. P., Energy & Fuels, 1991, 5, 497. The last four examples in Table 5 used an iron oxide catalyst (Fe$_2$O$_3$) supported on commercial grades of γ-alumina; the iron oxide was loaded on the support at a 15% level. Three of the catalysts used basic alumina as the support, while the fourth used acidic alumina. A similar catalyst has been used for the hydrotreating of hydrochloric acid lignin in anthracene at 450° C. See, Schultz, T. P., Preto, R. J., Pittman, J. L., and Goldstein, I. S., J. Wood Chem. and Tech., 1982, 2, 17. The Fe$_2$O$_3$/Al$_2$O$_3$ catalysts were prepared by loading or coating the iron salt on the catalyst support.

An effective amount of iron nitrate, Fe(NO$_3$)$_3$, was dissolved in water at about 50° C. to yield a loading of iron oxide on the aluminum support of from about 1% to about 50% by weight, preferably of from 5% to about 30% by weight and more preferably of from about 10% to about 20% by weight. The alumina support was added, and the overall mixture was stirred for about 30 minutes to about 1 hour. The water was stripped from the mixture and the solids were collected, dried, ground, and calcined at about 500° C. for about six hours under a constant air flow. The actual iron oxide content of the catalyst was confirmed by atomic absorption analysis.

The catalysts described in Table 5 were used in the reduction of lignin. The reaction conditions, organic mass balance, and weight percent yield of lignin phenol for each reaction are given in Table 6. Example No. 31 in Table 6 did not use a catalyst and was a control reaction

TABLE 6

Yield and Mass Balance of Lignin Reductions with Iron Based Catalysts

| Example No. | Lignin | Reaction Solvent | Reducing Gas H2, psig | Reducing Gas H2S, psig | Catalyst | Reaction Temp, °C. | Mass Balance, % | Wt % Yield of Lignin Phenol |
|---|---|---|---|---|---|---|---|---|
| 19 | Ind At | $H_2O$ | 1000 | | Phenol | 350 | 64 | 50 |
| 20 | Ind At | Tetralin | 1000 | | Fe(II)S | 350 | 84 | 80 |
| 21 | Ind At | Tetralin | 1000 | | Fe(II)S | 410 | 68 | 66 |
| 22 | Ind At | $H_2O$/ Tetralin | 600 | | $FeCl_2$, $CuSO_4$, $SnCl_2$ $Na_2S$ Phenol | 410 | 67 | 60 |
| 23 | Ind At | Tetralin | 1000 | | FeS, CuS, $SnS_2$ | 410 | 68 | 65 |
| 24 | Ind At | Tetralin | 800 | 200 | $Fe(IV)S_2$ | 410 | 64 | 63 |
| 25 | Ind At | Tetralin | 1000 | | $Fe_2O_3/SO_4^=$ | 410 | 69 | 66 |
| 26 | Ind At | Tetralin | 1000 | | imp. $FeSO_4$ | 410 | 62 | 62 |
| 27 | Ind At | Tetralin | 1000 | | $F_2O_3/b$-$Al_2O_3$ | 410 | 61 | 58 |
| 28 | Ind At | Tetralin | 800 | 200 | $F_2O_3/b$-$Al_2O_3$ | 410 | 47 | 45 |
| 29 | Ind-JHW | Tetralin | 1000 | | $F_2O_3/b$-$Al_2O_3$ | 410 | 63 | 43 |
| 30 | Ind At | Tetralin | 1000 | | $F_2O_3/b$-$Al_2O_3$ | 410 | 59 | 57 |
| 31 | Ind At | Tetralin | 1000 | | none | 410 | 52 | 52 |
| 32 | Ind. At | Tetralin | 800 | 200 | none | 410 | 51 | 50 |

In Table 6, the mass balance is the amount of organic lignin material (lignin phenol product plus any lignin char produced in the reaction) relative to the amount of lignin charged to the reactor. Lignin char is a high molecular weight lignin product formed in the reaction that is isoluble in THF. The percent yield of lignin phenol is the weight of product relative to the amount of lignin reacted. The yield of lignin phenol is in the range of 60–66% in several of the reactions. The exceptions to this range of yields occurs for the two reactions done at 350° C. (examples 19 and 20), for the uncatalyzed reaction of example 32, and for the reactions which used $Fe_2O_3$ as the catalyst (examples 27 and 30). Only a low amount of lignin char formed in each of these reactions. This is reflected by the mass balance being within a few per cent of the yield.

Examples 33–46

The thusly produced lignin phenols were converted to the sulfonated product by using the standard procedure of reaction of the lignin phenol with the 1:1 complex of $SO_3^-$. dioxane, which is described in U.S. Pat. No. 4,739,040 and is incorporated herein by reference for all purposes. The interfacial tensions were measured for 2% solutions in Illinois Well Supply Water (35,000 ppm TDS) against either Robinson or Salem (Benoist) crude oils. The exact composition of the Illinois brine was:

Brine Composition (WSW, well supply water)

$Mg^{+2}$=0.210 g/l $Ca^{+2}$=0.346 g/l $Na^+$=12.67 g/l $Cl^-$=18.89 g/l $SO_4^{-2}$=2.53 g/l

Total=34.65 g/l (34650 ppm TDS)

The results are shown in Table 7. The equivalent and molecular weights are shown for each lignin phenol prior to sulfonation.

TABLE 7

Interfacial Tensions of Sulfonated Lignin Phenols from Iron Based Catalysts

| Example No. | Lignin Phenol Ex. No. | Lignin | Solvent | Gas | Temp °C. | VPO Mol Wt | CFD No. | IFT's, mdyne/cm Robinson | IFT's, mdyne/cm Salem |
|---|---|---|---|---|---|---|---|---|---|
| 33 | 19 | Ind At | $H_2O$ | $H_2$ | 350 | 224 | 515 | 2845 | n.d. |
| 34 | 20 | Ind At | Tetralin | $H_2$ | 350 | 708 | — | — | — |
| 35 | 21 | Ind At | Tetralin | $H_2$ | 410 | 312 | 521 | 242 | 583 |
| 36 | 22 | Ind At | $H_2O$/ Tetralin | $H_2$ | 410 | 258 | 522 | 57 | 259 |
| 37 | 23 | Ind At | Tetralin | $H_2$ | 410 | 342 | 529 | 808 | 1012 |
| 38 | 24 | Ind At | Tetralin | $H_2$ $H_2S$ | 410 | 269 | 538 | 121 | 345 |
| 39 | 25 | Ind At | Tetralin | $H_2$ | 410 | 315 | 562 | 444 | 809 |
| 40 | 26 | Ind At | Tetralin | $H_2$ | 410 | 318 | 563 | 963 | 1402 |
| 41 | 27 | Ind At | Tetralin | $H_2$ | 410 | 249 | — | 510 | 562 |
| 42 | 28 | Ind At | Tetralin | $H_2$ $H_2S$ | 410 | 234 | — | 141 | 293 |

TABLE 7-continued

Interfacial Tensions of Sulfonated Lignin Phenols from Iron Based Catalysts

| Example No. | Lignin Phenol Ex. No. | Lignin | Solvent | Gas | Temp °C. | VPO Mol Wt | CFD No. | IFT's, mdyne/cm Robinson | Salem |
|---|---|---|---|---|---|---|---|---|---|
| 43 | 29 | Ind-JHW | Tetralin | $H_2$ | 410 | 258 | — | 203 | 389 |
| 44 | 30 | Ind At | Tetralin | $H_2$ | 410 | 240 | — | 294 | 582 |
| 45 | 31 | Ind At | Tetralin | $H_2$ | 410 | 290 | 378 | 1620 | 2380 |
| 46 | 32 | Ind At | Tetralin | $H_2$ $H_2S$ | 410 | 277 | 537 | 187 | 478 |

IFT data of Table 7 together with the yield data of Table 6 show that the iron sulfide catalyzed reaction of example 35, the iron disulfide catalyzed reaction of example 38, and the mixture of ferrous chloride, cupric sulfate, tin chloride, and sodium monosulfide of example 36, gave the best combination of high yields and low IFTs. The other examples in Table 7, either had generally higher IFTs or lower lignin phenol yields. The lignin phenol product of example 34 was not sulfonated because of its very high molecular weight and since previous studies had shown that generally very high molecular weight lignin phenol products form poor lignin products. The molecular weights of the lignin phenols produced from the supported iron oxide catalysts, $Fe_2O_3/Al_2O_3$ were generally low ranging from about 234 to about 258 g/mol.

Examples 47–60

The results of the chemical analysis of the lignin phenol products formed from the iron based catalysts are listed in Table 8.

The analysis data in Table 8 shows the extensive deoxygenation, relative to the unreacted lignin, that has occurred during the high temperature reduction reaction. Generally except for reaction Nos. 21, and 22, the iron catalysts were not as effective as the metal oxide type catalysts for deoxygenation. The sulfonated lignin phenol of reaction No. 21 had IFT values comparable to the ones obtained with the metal oxide catalysts. This similarity is also reflected in the similar oxygen of the lignin phenols of example 49 of Table 8.

The elemental and methoxy analyses in Table 8 were converted to empirical formulas based on $C_9$ units, the phenyl propane monomer unit of lignin. By using $C_9$ formulas, the relative compositions of the lignin phenols can be compared between the different catalysts, and between the unreacted lignin. The $C_9$ formulas are given in Table 9.

TABLE 8

Chemical Analysis of Lignin Phenol Products from Iron Based Catalysts

| Note-book No. | Lignin Phenol | Lignin | Solvent | Gas | Catalyst | Temp °C. | VPO Mol Wt. | Eq Wt, g/eg | PhOH meq/g | COOH meq/g | % C | % H | % O | % S | % Ome | % Deoxyg |
|---|---|---|---|---|---|---|---|---|---|---|---|---|---|---|---|---|
| 47 | 19 | Ind At | $H_2O$ | $H_2$ | Phenol | 350 | 224 | 217 | 4.24 | 0.37 | 75.26 | 5.85 | 15.06 | 0.30 | 0.91 | 47 |
| 48 | 20 | Ind AT | Tetralin | $H_2$ | Fe(II)S | 350 | 708 | 259 | 3.32 | 0.54 | 72.55 | 6.39 | 17.14 | 0.65 | 8.67 | 40 |
| 49 | 21 | Ind AT | Tetralin | $H_2$ | Fe(II)S | 410 | 312 | 224 | 4.17 | 0.29 | 76.71 | 7.32 | 9.71 | 0.32 | 0.84 | 66 |
| 50 | 22 | Ind AT | $H_2O$/Tetralin | $H_2$ | $FeCl_2$, $CuSO_4$, $SnCl_2$ $Na_2S$ Phenol | 410 | 258 | 229 | 4.17 | 0.19 | 80.07 | 6.94 | 9.39 | 0.16 | 0.24 | 67 |
| 51 | 23 | Ind AT | Tetralin | $H_2$ $H_2S$ | FeS, CuS, $SnS_2$ | 410 | 342 | 222 | 3.99 | 0.52 | 76.05 | 6.99 | 13.59 | 0.50 | 0.66 | 52 |
| 52 | 24 | Ind AT | Tetralin | $H_2$ | $Fe(IV)(S_2)$ | 410 | 269 | 231 | 3.92 | 0.41 | 74.10 | 7.38 | 14.96 | 2.05 | 0.80 | 47 |
| 53 | 25 | Ind AT | Tetralin | $H_2$ | $F_2O_3/SO_4^=$ | 410 | 315 | 240 | 3.92 | 0.25 | 77.63 | 6.14 | 12.65 | 0.37 | 0.59 | 55 |
| 54 | 26 | Ind AT | Tetralin | $H_2$ | imp. $FeSO_4$ | 410 | 318 | 228 | 4.03 | 0.35 | 76.23 | 6.77 | 14.21 | 0.44 | 1.16 | 50 |
| 55 | 27 | Ind AT | Tetralin | $H_2$ | $F_2O_3$/b-$Al_2O_3$ | 410 | 249 | 322 | 3.70 | 0.31 | 79.59 | 6.81 | 11.00 | 0.45 | 0.48 | 61 |
| 58 | 28 | Ind AT | Tetralin | $H_2$ $H_2S$ | $F_2O_3$/b-$Al_2O_3$ | 410 | 234 | 273 | 4.02 | 0.25 | 76.94 | 6.90 | 12.99 | 1.52 | 0.47 | 54 |
| 57 | 29 | Ind-JHW | Tetralin | $H_2$ | | 410 | 258 | 355 | 3.57 | 0.31 | 78.39 | 6.65 | 13.29 | 0.62 | 0.84 | 53 |
| 58 | 30 | Ind AT | Tetralin | $H_2$ | | 410 | 240 | 333 | 3.87 | 0.29 | 78.84 | 6.38 | 12.59 | 0.47 | 0.54 | 56 |
| 59 | 31 | Ind AT | Tetralin | $H_2$ | none | 410 | 291 | 257 | 3.63 | 0.27 | 83.79 | 7.17 | 7.53 | 0.31 | — | 73 |
| 60 | 32 | Ind AT | Tetralin | $H_2$ | | 410 | 277 | 221 | 4.21 | 0.32 | 75.44 | 7.10 | 13.97 | 1.42 | 0.59 | 51 |
| | unreacted INDULIN AT ™ | | | — | — | — | | | 2.01 | 1.74 | 65.63 | 5.80 | 26.29 | 1.12 | 13.40 | — |
| | unreacted Indonesian JHW | | | — | — | — | — | — | 2.40 | 1.89 | 59.71 | 5.10 | 26.50 | 1.84 | 14.31 | — |

TABLE 9

Comparison of C-9 Empirical Formulae of Lignin Phenol Products from Iron Based Catalysts versus Original, Unreacted Lignin

| Example No. | Lignin Phenol Example No. | Lignin | Solvent | Gas | Catalyst | Temp °C | C | H | O | S | OCH$_3$ |
|---|---|---|---|---|---|---|---|---|---|---|---|
| 47 | 19 | Ind AT | H$_2$O | H$_2$ | Phenol | 350 | 9 | 8.2 | 1.31 | 0.00 | 0.05 |
| 48 | 20 | Ind AT | Tetralin | H$_2$ | Fe(II)S | 350 | 9 | 8.6 | 1.24 | 0.03 | 0.44 |
| 49 | 21 | Ind AT | Tetralin | H$_2$ | Fe(II)S | 410 | 9 | 10.2 | 0.82 | 0.01 | 0.04 |
| 50 | 22 | Ind AT | H$_2$O/Tetralin | H$_2$ | FeCl$_2$, CuSO$_4$, SnCl$_2$ Na$_2$S Phenol | 410 | 9 | 9.3 | 0.78 | 0.01 | 0.01 |
| 51 | 23 | Ind AT | Tetralin | H$_2$ | FeS, CuS, SnS$_2$ | 410 | 9 | 9.8 | 1.18 | 0.02 | 0.03 |
| 52 | 24 | Ind AT | Tetralin | H$_2$ H$_2$S | Fe(IV)(S2) | 410 | 9 | 10.6 | 1.33 | 0.04 | 0.04 |
| 53 | 25 | Ind AT | Tetralin | H$_2$ | Fe$_2$O$_3$/SO$_4^=$ | 410 | 9 | 8.4 | 1.08 | 0.03 | 0.03 |
| 54 | 26 | Ind AT | Tetralin | H$_2$ | imp. FeSO$_4$ | 410 | 9 | 9.4 | 1.21 | 0.05 | 0.05 |
| 55 | 27 | Ind AT | Tetralin | H$_2$ | F$_2$O$_3$/b-Al$_2$O$_3$ | 410 | 9 | 9.1 | 0.91 | 0.02 | 0.02 |
| 56 | 28 | Ind AT | Tetralin | H$_2$ H$_2$S | F$_2$O$_3$/b-Al$_2$O$_3$ | 410 | 9 | 9.6 | 1.12 | 0.07 | 0.02 |
| 57 | 29 | Ind-JHW | Tetralin | H$_2$ | F$_2$O$_3$/b-Al$_2$O$_3$ | 410 | 9 | 9.0 | 1.11 | 0.03 | 0.04 |
| 58 | 30 | Ind AT | Tetralin | H$_2$ | F$_2$O$_3$/b-Al$_2$O$_3$ | 410 | 9 | 8.6 | 1.06 | 0.02 | 0.02 |
| 59 | 31 | Ind AT | Tetralin | H$_2$ | none | 410 | 9 | 9.2 | 0.61 | 0.01 | — |
| 60 | 32 | Ind AT | Tetralin | H$_2$, H$_2$S | none | 410 | 9 | 10.0 | 1.23 | 0.06 | 0.03 |
| Unreacted INDULIN AT ™ | | | — | — | — | | 9 | 7.99 | 2.17 | 0.06 | 0.77 |
| Unreacted Indonesian-JHW | | | — | — | — | | 9 | 7.34 | 2.39 | 0.11 | 0.92 |

As noted previously, the oxygen values reflect the substantial deoxygenation that has occurred in the reaction.

Examples 61–63
Laboratory Corefloods with Lignin Phenol Surfactants.

The oil recovery ability of the lignin phenol surfactants were demonstrated by laboratory corefloods using surfactant blends of the lignin products.

The surfactant blends were prepared at a level of 2% total active surfactant in a simulated mid-continent oil field brine. The brine had about 68,000 ppm TDS, with 3700 ppm divalent cations (Ca$^{+2}$ and Mg$^{+2}$). The exact composition of the brine was:

Brine Composition
Mg$^{-2}$=0.932 g/l
Ca$^{+2}$=2.811 g/l
Na$^+$=22.03 g/l
Cl$^-$=41.40 g/l
SO$_4^{-2}$=0.177 g/l
HCO$_3^-$=0.225 g/l
Total=67.57 g/l (67570 ppm TDS)

Components in the surfactant system included the lignin phenol sulfonate, TRS-18™ (an oil soluble petroleum sulfonate) made by Witco Co. and LN-60COS™, a linear C$_{12}$–C$_{14}$ alcohol ethoxy sulfate with an average of 6 ethylene oxide units per molecule. The LN-60COS™ serves as a solubilizer in the high salinity brine.

The corefloods were done in 1 foot by 2 inch×2 inch Berea sandstone cores. The cores had been brine saturated, then oil saturated with a mid-continent U.S. oil, and then water flooded to residual oil saturation.

The 2% surfactant solution (0.20 pore volume) was then injected into the water flooded core. It was followed by continuous injection of a polyacrylamide solution in fresh water (343 ppm TDS) until oil production stopped. The composition of the surfactant slug, the residual oil saturation, and the tertiary recovery are shown in Table 10.

TABLE 10

Tertiary Oil Recoveries with Lignin Phenol Surfactants

| | | Surfactant Composition, wt. % | | | | |
|---|---|---|---|---|---|---|
| Example | Lignin Phenol Ex. No. | Lignin Phenol Surfactant | TRS-18 | LN-60COS | Socf | Er, % |
| 61 | 5 | 0.6 | 0.8 | 0.6 | 0.10 | 76 |
| 62 | 9 | 0.6 | 0.8 | 0.6 | 0.09 | 73 |
| 63 | 16 | 0.6 | 0.8 | 0.6 | 0.10 | 75 |

The data in Table 10 show high tertiary recoveries and illustrate that the lignin phenol surfactants can be used to recover substantial amounts of waterflood residual oil. "Socf" refers to oil saturation after the chemical flood, and it is the fraction of available pore space filled with oil. Typical reservoirs start with an initial oil saturation of about 0.7. After the water flood, the oil saturation is reduced to from about 0.3 to about 0.4. "Er %" refers to the percent of water flood residual oil, i.e., the oil remaining after water flood that is recovered by the chemical flood.

Examples 64–67

The effect of various lignin feedstocks on the lignin phenol properties were studied in examples 64–67. Four lignin samples were reduced with H$_2$ in tetralin at 410° C. using a commercially available hydrotreating catalyst, C-444™, from Criterion Catalyst Co., Houston, Tex. C-444™ is a cobalt oxide/molybdenum oxide catalyst supported on alumina having a ratio of molybdenum oxide to cobalt oxide of about 3.5. The general reaction procedure was similar to the one described previously. Sulfonated lignin phenols were prepared from the lignin phenol products. This was done in order to better characterize the respective products and to determine the effects of various lignin feedstocks on the surfactant properties of the sulfonated surfactants. Interfacial tension measurements were determined against two mid-continent U.S.A. crude oils from Illinois, Robinson and Salem Benoist. The sulfonation procedure involves the reaction of lignin phenol with a complex of sulfur trioxide and dioxane, which has been described in detail in U.S. Pat. No. 4,739,040, previously incorporated by reference. The lignin samples were obtained from two pulp mills in Indonesia, and from two other mills in the U.S. and Canada. The feedstocks used are described below.

Indonesian Jungle Hardwood Lignin (Ind JHW)

A sample of concentrated Kraft black liquor was obtained from the Indah Kiat Pulp and Paper Factory. This plant is located in the Riau Province on the island of Sumatra, and is close to the Minas and Duri oil fields. Jungle hardwood is exclusively pulped at this mill by the Kraft process. The lignin was precipitated from the black liquor by acidification with hydrochloric acid. After filtration, the lignin was washed and dried.

Indonesian Bagasse Lignin (Ind BAG)

A sample of weak Kraft black liquor was obtained from the Kertas Leces Probolinggo Plant on East Java. This sample was obtained from the Kraft pulping of sugar cane bagasse (bagasse is the sugar cane stalk remaining after crushing and squeezing out the juice to make sugar). This lignin is a grass lignin. It was isolated by a similar precipitation method as described for the Indonesian jungle hardwood lignin.

U.S. Softwood Lignin (INDULIN AT™)

A sample of purified Kraft pine lignin was obtained from Westvaco. Westvaco is the largest supplier of Kraft lignin in the United States. They pulp exclusively 100% pine at its mill in Charleston, S.C. This mill has a potential of 800 tons per day of recoverable Kraft lignin solids. Normally, it isolates only 10–15% of the lignin, with the remainder being burned as fuel. Westvaco precipitates the lignin from the black liquor stream by neutralization. The precipitate is then washed and dried. The purified lignin is marketed as INDULIN AT™ and has a lignin content of 97%, the remainder is inorganic ash and ammonia (for processing).

U.S./Canadian Hardwood Lignin (Alcell)

A purified sample of organo-solv lignin was obtained from Repap in Valley Forge, Pa. Repap is developing markets for the hardwood lignin produced by the alcohol solvolysis pulping of hardwoods. This lignin provides a comparison of the affect of Kraft pulping on lignin properties in the lignin phenol reaction.

Description of the Indonesian Lignin Isolation Procedures

The following is an example of the process for isolating Ind JHW lignin from Indonesian jungle hardwood black liquor. Approximately 1220 grams of the concentrated black liquor were mixed with an approximately equal weight of deionized water in a 4L beaker and stirred. The pH, initially at 12, was reduced to approximately 3 using concentrated hydrochloric acid. Foaming occurred at a pH of about 8–9. The mixture was filtered using aspiration. The solids were reslurried in water, filtered, and "washed" again; this time the slurry was heated to approximately 54° C. The slurry was filtered again, and the solids were recovered. The solids were air dried for about 2 hrs., oven dried for about 8 hrs., ground, and oven dried for another 2 hours. About 260 g. of Indonesian JHW lignin were isolated from the concentrated black liquor, which then calculates to have a lignin content of 21.3%.

The procedure for isolating Ind BAG lignin from Indonesian bagasse black liquor is very similar to that for the Ind-JHW; the following is a representative example. Approximately 1520 g, of the weak black liquor were measured into a 4L beaker; additional water was not added because the black liquor was not concentrated. The pH (originally at 12) was reduced to about 3 using concentrated HCl. Again, foaming occurred at a pH of approximately 8–9. The mixture was filtered and "washed" twice. However, during the second wash, the slurry was coo led in an ice bath (about 10° C.) instead of heated. The solid lignin was air-dried, oven-dried, ground, and oven-dried again according to the Ind JHW process. In this example, about 82 g. of Indonesian BAG lignin was recovered from the black liquor; the weak black liquor was calculated then to be 5.4% lignin.

Lignin Analyses

After each of the lignin samples were isolated from the black liquor and dried, the samples were analyzed for methoxyl (OMe or $OCH_3$), elemental analysis (C, H, O, and S), organic sulfur, phenolic hydroxyls, and carboxylic acids. The results of these chemical analysis are shown in Tables 11 and 12.

TABLE 11

Elemental Analysis of Lignin Samples

| Lignin | Source | C, % | H, % | O, % | S, % | Ash, % | $\Sigma^1$ | Lignin Purity, % |
|---|---|---|---|---|---|---|---|---|
| Ind JHW | hardwood, Kraft | 59.71 | 5.10 | 26.50 | 1.84 | 5.04 | 98.19 | 94 |
| Alcell | hardwood, org-solv | 64.58 | 5.45 | 27.98 | 0.0195 | 0.06 | 98.09 | 97 |
| INDULIN AT ™ | softwood, Kraft | 65.53 | 5.80 | 26.29 | 1.12 | 2.25 | 100.99 | 97[2] |
| Ind BAG | bagasse, Kraft | 61.85 | 5.98 | 29.34 | 0.05 | 7.83 | 105.05 | 97 |

[1]Sum of the % C, % H, % O, % S, and % Ash.
[2]Westvaco's literature value for lignin content of INDULIN AT ™.

The elemental analysis data in the Table 11 show acceptable purity levels for all of the lignin samples. While each of the values for the Ind BAG lignin are reasonable, except the % ash, the sum is too high at 105.05%. In addition, the % S for this lignin is very low for a Kraft lignin. It may be that this lignin sample is just representative of grass lignins that have been pulped by the Kraft process.

TABLE 12

Functional Group Analysis of Lignin Samples

| Lignin | Source | MeO, % | Total S, % | Organic S, % | PhOH, meq/g | COOH, meq/g | Org S/ MeO[2] | PhOH/ MeO[2] |
|---|---|---|---|---|---|---|---|---|
| Ind JHW | hardwood, Kraft | 14.31 | 1.84 | 0.36 | 2.40 | 1.89 | 0.024 | 0.52 |
| Alcell | hardwood, org-solv | 17.51 | 0.02 | 0.00195 | 2.08 | 0.63 | 0.0001 | 0.37 |
| INDULIN AT ™ | softwood, Kraft | 13.40 | 1.66 | 0.18 | 2.01 | 1.74 | 0.013 | 0.46 |
| Ind Bag | bagasse, Kraft | 11.20 | 0.05 | n.d. | 1.93 | 1.21 | 0.004[3] | 0.53 |

[1]% Organic sulfur calculated by (% $S_{total}$ − % $S_{organic}$. The ionic sulfur was determined by mild oxidation of the lignin with hydrogen peroxide, followed by ion chromatography for sulfate, SO = [11].
[2]Molar ratios.
[3]All % S assumed to be organic sulfur.

The functional group values in Table 12 reflect a dependence on the type of lignin. Because of their chemical structure, the hardwood lignins have the highest methoxyl content, followed by the softwoods, and then the grass lignins. Reported values for hardwood are 18–22% methoxyl, softwoods average about 15% methoxyl, and grasses are reported in the range of 13–14% methoxyl. See K. U. Sarkanen and H. L. Hergert, "Lignins, Occurrences, Formation, Structure and Reaction", Wiley-Interscience, N.Y., 1971. The values in Table 12 reflect these relative ranges.

The elemental analysis values in Table 11 and the methoxyl analyses were used to calculate empirical molecular formulas for each of the lignin samples. The empirical formulas are based on the $C_9$ propyl phenol unit of lignin. This allows easy comparison of the chemical analysis for the different lignin types.

TABLE 13

C-9 Empirical Formulas for Lignin Samples

| Lignin | Source | C | H | 0 | S | OMe | Calc[1] Mol Wt |
|---|---|---|---|---|---|---|---|
| Ind JHW | hardwood, Kraft | 9 | 7.34 | 2.39 | 0.11 | .92 | 186 |
| Alcell | hardwood, org-solv | 9 | 6.95 | 2.22 | 0.001 | 1.06 | 183 |
| INDULIN AT ™ | softwood, Kraft | 9 | 7.99 | 2.17 | 0.06 | 0.77 | 176 |
| IndBAG | bagasse, Kraft | 9 | 9.12 | 2.77 | 0.003 | 0.68 | 183 |

[1]Calculated molecular weight from C-9 empirical formula.

The $C_9$ formulas in Table 13 can be grouped into the three categories based on the type of wood. The hardwood lignins have MeO values of about 0.9–1.1; while the softwood lignin has a MeO value of about 0.77. The bagasse lignin has a MeO value of about 0.68. These values fall in the ranges expected for the different lignin types.

Figure 3:
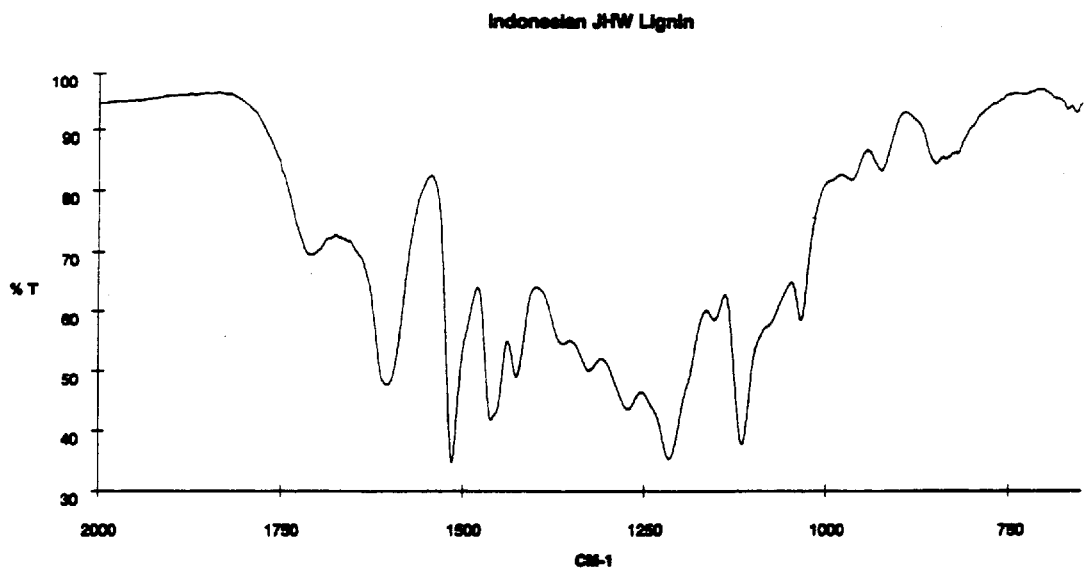
FIG. 3 depicts two FTIR spectra of lignin samples, the top spectra is for Indonesian JHW lignin and the bottom spectra is for Indonesian BAG lignin.
Figure 3:
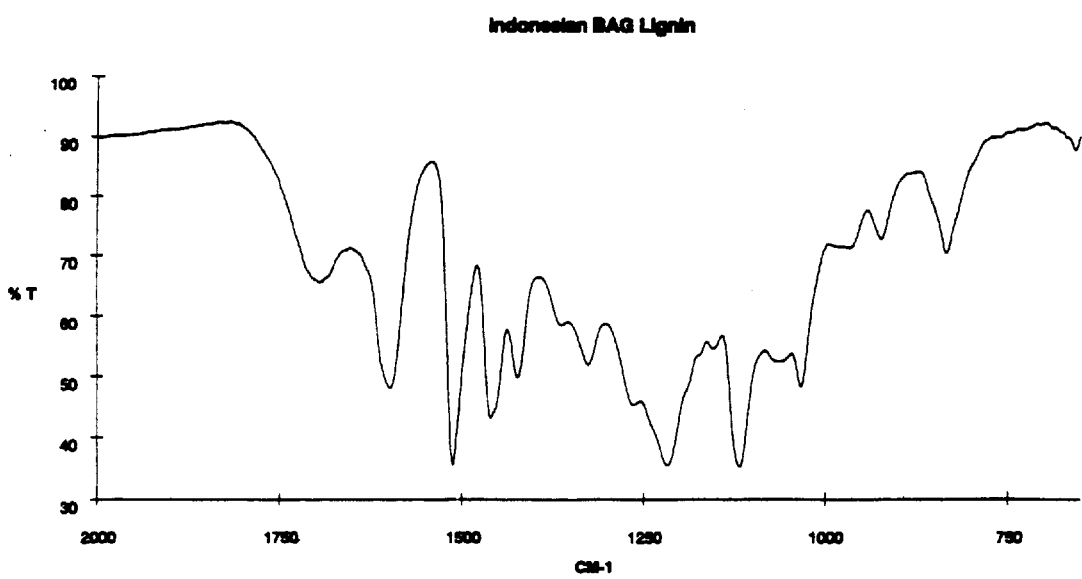
Figure 4:
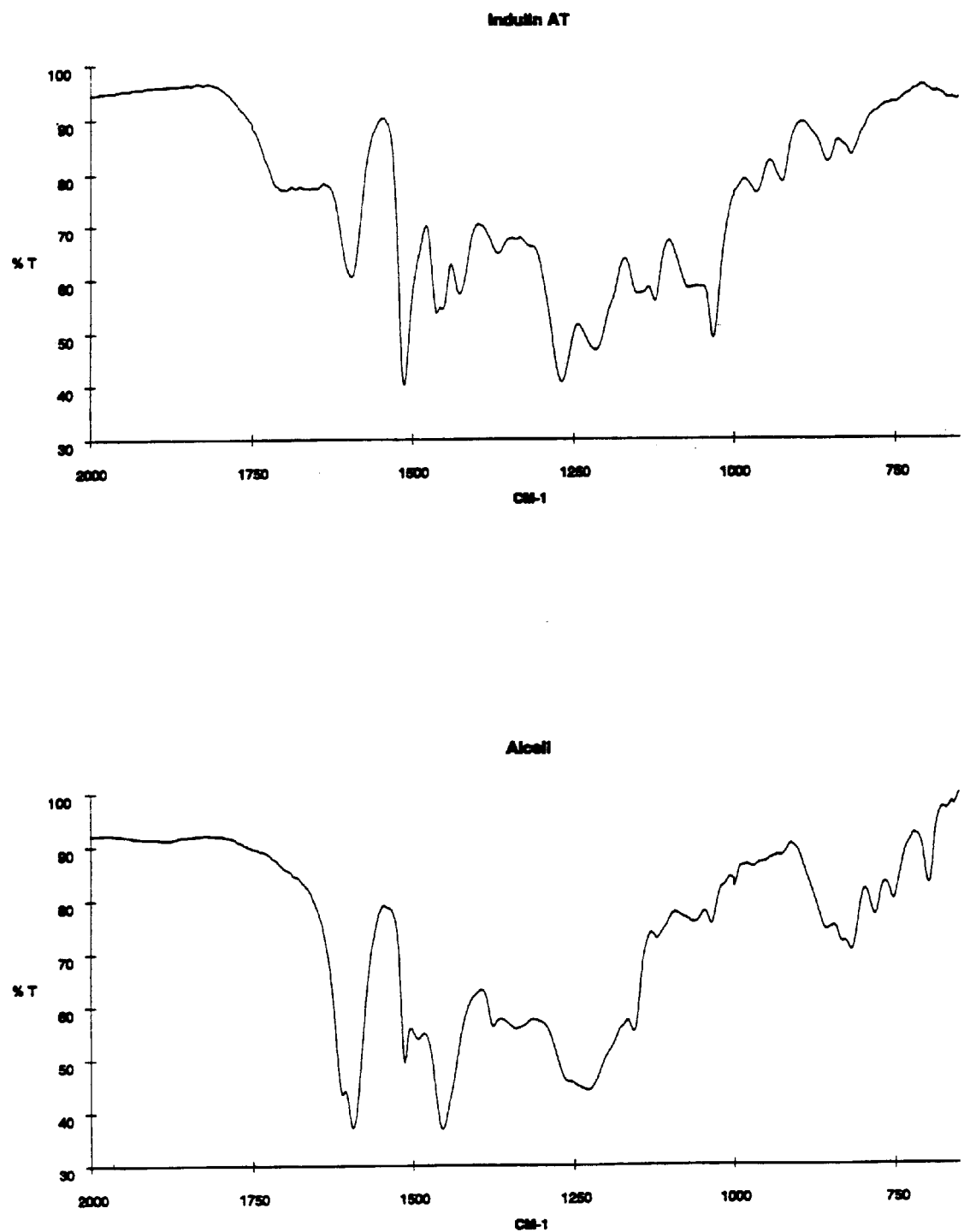
FIG. 4 depicts two FTIR spectra of lignin samples referred to as Indulin AT (top spectra) and Alcell (bottom spectra).

FTIR (Fourier Transform Infrared Spectroscopy) analysis of the lignins showed that the Ind JHW, Ind BAG and the Alcell lignins are generally similar to the INDULIN AT™ lignin. The FTIR spectra of the different lignin feedstocks are shown in FIGS. 3 and 4.

The yield and IFT results of Tables 15 and 16 show that lignin produced in Indonesian pulp mills could be isolated, chemically modified, and used in EOR operations. Indonesian lignins can be successfully used in the production of lignin phenol surfactants using the method of the present invention. Generally, the Indonesian lignins (jungle hardwood lignin and sugarcane bagasse lignin) give lignin phenol products that are similar to products from North American lignins (hardwoods, softwoods, or grass lignins) and at comparable yields using the catalyzed method of the present invention. Also, the Indonesian lignin phenol sulfonates have similar surfactant properties to the INDULIN AT™ phenol surfactants as indicated by their similar IFTs. Table 15 lists the molecular weights and IFT values for the lignin phenol products.

The IFT values in Table 15 are generally similar to the ones obtained from INDULIN AT™ lignin and are considerably better than the values for the sulfonated lignin phenols prepared by non-catalyzed reductions in $CO/H_2O$ systems and which are described in U.S. Pat. No. 4,739,040.

TABLE 14

Yield and Mass Balance of Lignin Reductions with $H_2$ in Tetralin with C-444[1]

| Lignin | Lignin Type | Temp, ° C. | Mass Balance, % | Wt % Yield of Lignin Phenol |
|---|---|---|---|---|
| Ind JHW | hardwood | 410 | 57 | 53 |
| Alcell | hardwood | 410 | 56 | 54 |
| Indulin AT ™ | softwood | 410 | 71 | 65 |
| Ind BAG | grass | 410 | 67 | 63 |

[1]All reactions, were performed at the indicated temperature for 30 minutes; the amount of $H_2$ charged to the reactor was 9.5 psig $H_2$/gram of lignin (1000 psig)

TABLE 15

Interfacial Tensions of Sulfonated Lignin Phenols from $H_2$ + C-444 in Tetralin

| Example No. | Lignin | Lignin Type | Temp ° C. | Mol Wt g/mol | IFT Values, mdyne/cm[1] | |
|---|---|---|---|---|---|---|
| | | | | | Robinson | Salem |
| 64 | Ind JHW | hardwood | 410 | 310 | 100 | 150 |
| 65 | Alcell | hardwood | 410 | 340 | 70 | 50 |
| 66 | Indulin AT ™ | softwood | 410 | 340 | 60 | 130 |
| 67 | Ind BAG | grass | 410 | 270 | 40 | 60 |

TABLE 15-continued

Interfacial Tensions of Sulfonated Lignin
Phenols from $H_2$ + C-444 in Tetralin

| Example No. | Lignin | Lignin Type | Temp °C. | Mol Wt g/mol | IFT Values, mdyne/cm[1] Robinson | Salem |
|---|---|---|---|---|---|---|

[1]IFT's measured as 2% solutions in synthetic field brine (34,400 ppm TDS) against the indicated crude oil.

Analysis of the Lignin Phenol Products

The lignin phenol products from these reactions were characterized by the same analysis methods as the products described in the previous examples. The analytical results are presented in Table 16. The chemical analyses of these products was similar to the analysis values found for the other lignin phenol products.

The analytical results for these lignin phenols were converted to $C_9$ units, based on the phenyl propane monomer unit of lignin. The empirical formulas in Table 17 show the same trends seen in the other reactions. Namely, extensive loss of oxygen and methoxy ($OCH_3$) groups are observed. However, this could not possibly explain why these products have lower IFT values than the ones obtained for products prepared in $CO/H_2O$ systems and which are described in U.S. Pat. No. 4,739,040.

TABLE 16

Chemical Analysis of Lignin Phenol
Products from the $H_2$ + C-444 in Tetralin Reactions

| Lignin | Lignin Type | Mol Wt g/mol | Eq Wt g/eq | PhOH meq/g | % C | % H | % O | % S | % $OCH_2$ |
|---|---|---|---|---|---|---|---|---|---|
| Ind JHW | hardwood | 310 | 240 | 4.17 | 0.08 | 80.22 | 10.62 | 0.11 | 0.59 |
| Alcell | hardwood | 340 | 250 | 3.92 | 0.15 | 79.60 | 10.70 | 0.00 | 0.34 |
| INDULIN AT ™ | softwood | 340 | 220 | 3.91 | 0.59 | 80.24 | 10.38 | 0.00 | 0.39 |
| Ind BAG | grass | 270 | 210 | 4.50 | 0.23 | 78.11 | 13.54 | 0.00 | 0.97 |

TABLE 17

C-9 Empirical Formulae for Lignin Phenol
Products from the $H_2$ + C-444 in Tetralin Reactions

| Example No. | Lignin | Lignin Type | Reaction Temp, °C. | C | H | 0 | S | $OCH_2$ |
|---|---|---|---|---|---|---|---|---|
| 64 | Ind JHW | hard-wood | 410 unreacted | 9 9 | 10.10 7.34 | 0.87 2.39 | 0.000 0.110 | 0.03 0.92 |
| 65 | Alcell | hard-wood | 410 unreacted | 9 9 | 10.10 6.95 | 0.89 2.22 | 0.000 0.001 | 0.01 1.06 |
| 66 | INDULIN AT ™ | soft-wood | 410 unreacted | 9 9 | 9.90 7.99 | 0.86 2.17 | 0.000 0.060 | 0.02 0.77 |
| 67 | /Ind BAG | grass | 410 unreacted | 9 9 | 9.90 9.12 | 1.13 2.77 | 0.000 0.003 | 0.04 0.68 |

Examples 68–72

Mono/Di/Poly-Sulfonate Analysis by HPLC

Lignin phenol sulfonates were analyzed by reverse phase high performance liquid chromatography (HPLC) on a Waters Bondapak Phenyl Column to determine the amount of mono-, di-, and tri- (or poly) sulfonates formed in the sulfonation reaction. The method is described in D. R. Zornes, "An Experimental Investigation into the use of High Pressure Liquid Chromatography for the Determination of Petroleum Sulfonates", 1976, which is incorporated herein by reference. In examples 68–72, analysis of previously prepared lignin phenol sulfonates showed mono-sulfonate contents of 73–81%. In example 68, one of the new lignin products (Ind JHW, $H_2$/tetralin) was analyzed by this method. The results are shown in Table 18, along with the analysis of previously made lignin phenol sulfonates for comparison. Generally, the sulfonate analyses in Table 18 show no dependence on lignin source or on reaction conditions. The mono/di-sulfonate ratios are similar for all of the entries.

TABLE 18

Mono/Di-Sulfonate Analysis of Lignin Phenol Sulfonates

| Example No. | Description of Lignin Phenol | Mon/Di-Sulfonate Ratio |
|---|---|---|
| 68 | Ind JHW/Tetralin/$H_2$/C-444/410° C. | 68:32 |
| 69 | INDULIN AT ™/$H_2O$/CO/380° C. | 72:28 |
| 70 | LIGNOSITE 458[1]/$H_2O$/CO/350° C. | 73:27 |
| 71 | LIGNOSITE 458/$H_2O$/CO/410° C. | 77:23 |
| 72 | LIGNOSITE 458/$H_2O$/CO/440° C. | 81:19 |

[1]LIGNOSITE 458 is a desugared sodium lignosulfonate obtained from Georgia-Pacific.

FTIR Analysis of the Lignin Phenols

The lignin phenol products were analyzed by infrared spectroscopy (FTIR, Fourier Transfomed Infrared) to determine if differences in their chemical structures could be detected. These spectra are shown in FIGS. 1 and 2, for lignin phenol products prepared from the Indonesian JHW lignin of example No. 64.

Figure 2:
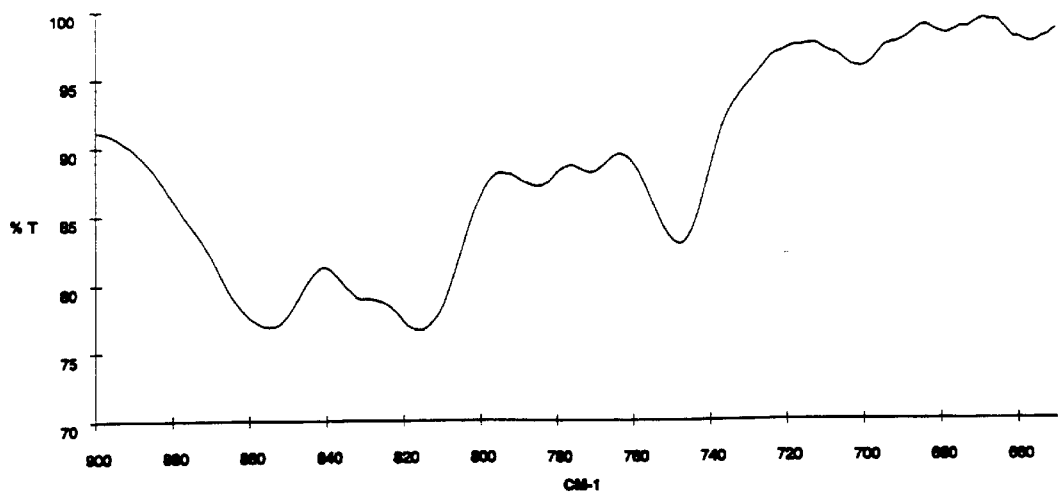
FIG. 2 depicts two FTIR spectra of lignin phenol products prepared from Indonesian JHW lignin (aromatic substitution pattern region. As in FIG. 1., the top spectra is for a product prepared using water/CO and the bottom spectra is for a product prepared using tetralin/hydrogen.
Figure 2:
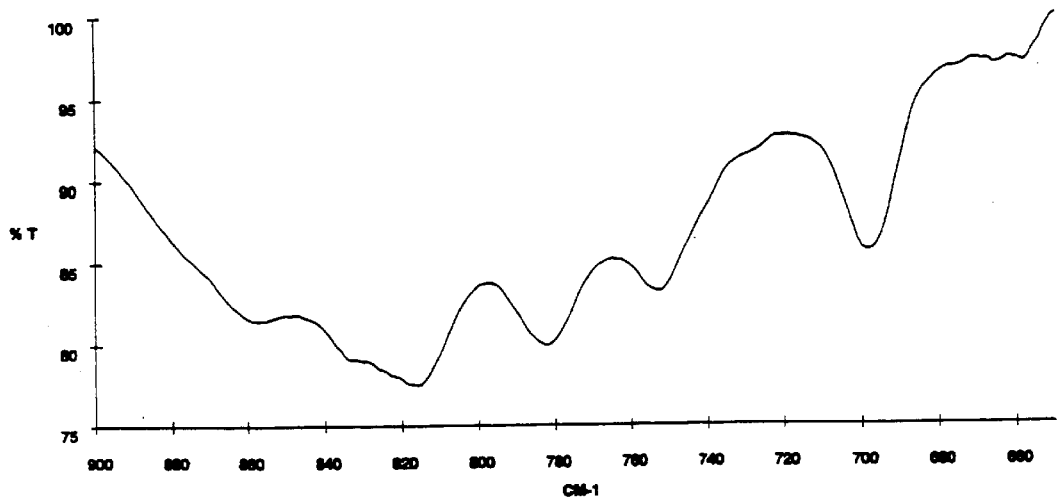

The spectra of lignin phenols made from the same Indonesian lignin in $CO/H_2O$ systems are also shown in FIGS. 1 and 2 for comparison. Two differences in the spectra were noticed. First, the lignin phenols from the water based reactions ($H_2O$/CO and $H_2O$/CO/$H_2S$) show a weak carbonyl absorption at 1700 $cm^{-1}$. The lignin phenols from the tetralin based reactions (tetralin/$H_2$/C-444) do not have a noticeable absorption in this region.

The second difference in the spectra is in the fingerprint region. Significant differences in the aromatic substitution pattern of the products have been found. The lignin phenol products show differences depending upon whether the reduction reaction was done in water (either $CO/H_2O$ or $CO/H_2O/H_2S$) versus reactions in tetralin ($H_2/C$-444). These differences can be seen in the spectra for lignin phenol products prepared from Indonesian JHW lignin.

Differences in the spectra of the products can also be seen in the aromatic substitution region, 900–650 $cm^{-1}$. For the products from the $H_2O/CO$ reactions, the prominent peaks are at 860, 810, and 750 $cm^{-1}$, which correspond to 1,4-disubstitution (i.e., 2 adjacent hydrogens on the aromatic ring) and 1,2-disubstitution patters on the ring. The products from the tetralin/$H_2$ reactions have major peaks at 860, 810, 780, 750, and 700 $cm^-$. The peaks at 780 and 700 $cm^{-1}$ are representative of aromatic rings with 3 adjacent hydrogens. This shows the differences between the lignin phenol products and how the reaction media is leading to a change in the chemical structure.

While in the foregoing specification certain embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A method of producing lignin phenol from lignin, the method comprising:
   placing lignin in contact with a hydrogen donor organic solvent;
   converting the lignin into low molecular weight-lignin phenol by reducing the lignin in the presence of a reducing agent and a catalyst at a temperature of at least about 200° C. and a pressure of at least about 100 psig;
   wherein said catalyst contains from about 1.0% to about 15% by weight molybdenum oxide and a second component selected from the group consisting of nickel oxide or cobalt oxide, wherein the weight ratio of molybdenum oxide to said second component ranges from about 3:1 to about 5:1, and wherein the molybdenum oxide and second component are supported on a support of alumina; and
   recovering the lignin phenols from the reaction mixture.

2. The method of claim 1, wherein the second catalyst component is cobalt oxide, the weight ratio of molybdenum oxide to the cobalt oxide ranges from about 2:1 to about 14:1, and the support is neutral alumina.

3. The method of claim 1, wherein the second catalyst component is nickel oxide, and the support is basic or neutral alumina.

4. A method of producing surfactants from lignin, the method comprising:
   placing lignin in contact with a hydrogen donor organic solvent;
   converting the lignin into low molecular weight-lignin phenol by reducing the lignin in the presence of a reducing agent and a catalyst at a temperature of at least about 200° C. and a pressure of at least about 100 psig yielding a reaction mixture containing the lignin phenol;
   recovering the lignin phenol from the reaction mixture; and
   converting the lignin phenol into lignin surfactants,
   wherein the hydrogen donor organic solvent is tetralin, lignin phenol or biomass oil and
   wherein the catalyst contains from about 1% to about 15% by weight molybdenum oxide and a second component selected from the group consisting of nickel oxide or cobalt oxide on a support selected from the group consisting of neutral alumina, basic alumina and acidic alumina.

5. The method of claim 4, wherein conversion of the lignin phenol into lignin surfactants includes a reaction selected from the group consisting of alkoxylation, alkylation, sulfonation, sulfation, alkoxysulfation, and sulfomethylation.

6. The method of claim 4, wherein the weight ratio of molybdenum oxide to said second component ranges from about 2:1 to about 14:1.

7. The method of claim 4, wherein said second component is cobalt oxide, the support is neutral alumina, and the weight ratio of molybdenum oxide to cobalt oxide ranges from about 3:1 to about 5:1.

8. The method of claim 4, wherein said second component is nickel oxide, the support is basic alumina, and the weight ratio of molybdenum oxide to nickel oxide ranges from about 3:1 to about 5:1.

9. The method of claim 4, wherein the reducing agent is selected from the group consisting of carbon monoxide, hydrogen, hydrogen sulfide and mixtures thereof.

10. A method of producing surfactants from lignin, the method comprising:
    placing lignin in contact with a hydrogen donor organic solvent;
    converting the lignin into low molecular weight-lignin phenol by reducing the lignin in the presence of a reducing agent and a catalyst at a temperature of at least about 200° C. and a pressure of at least 100 psig yielding a reaction mixture containing the lignin phenol;
    recovering the lignin phenol from the reaction mixture; and
    converting the lignin phenol into lignin surfactants
    wherein the catalyst is an iron based catalyst comprising: a) an iron sulfide; and b) at least one other sulfide of a metal selected from the group consisting of copper, silver tin, chromium, cobalt, nickel, zinc and molybdenum.

11. A surfactant composition made accordingly with the method of claims 4, 9 or 10.

12. A lignin phenol composition made accordingly with the method of claim 2.

13. The surfactant composition of claim 11 having an interfacial tension of less than about 600 mdynes/cm, measured as 2% by weight solutions in a brine having a content of about 35,000 ppm TDS against a crude oil having an average API gravity of from about 33° to about 36°.

14. A method of producing sulfonated lignin phenol surfactants from lignin, the method comprising:
    placing the lignin in contact with a hydrogen donor organic solvent;
    converting the lignin into low molecular weight-lignin phenol at a yield of at least 60% by reducing the lignin in the presence of a reducing agent and a catalyst, at a temperature of at least about 200° C. and a pressure of at least about 100 psig;
    recovering the oil soluble lignin phenols from the reaction mixture; and
    converting the lignin phenols into sulfonated lignin phenol surfactants by sulfonation.

15. A sulfonated lignin phenol surfactant made from lignin according to the method of claim 14, wherein said sulfonated lignin phenol surfactant has an interfacial tension that is less than about 1500 mdynes/cm, as measured as 2% solution in a brine having a content of about 35,000 ppm total dissolved solids against a crude oil having an average API gravity of from about 33° to about 36°.

16. The sulfonated lignin phenol surfactant of claim 15 having an interfacial tension less than about 600 mdynes/cm.

17. The method of claim 10, wherein the hydrogen donor organic solvent is tetralin, lignin phenol or biomass oil.

18. The method of claim 10, wherein conversion of the lignin phenol into lignin surfactants includes a reaction selected from the group consisting of alkoxylation, alkylation, sulfonation, sulfation, alkoxysulfation, and sulfomethylation.

* * * * *